United States Patent
Kushida

(10) Patent No.: US 7,465,081 B2
(45) Date of Patent: Dec. 16, 2008

(54) LIGHTING SYSTEM

(75) Inventor: Taro Kushida, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 65 days.

(21) Appl. No.: 11/371,654

(22) Filed: Mar. 9, 2006

(65) Prior Publication Data
US 2007/0211448 A1   Sep. 13, 2007

(30) Foreign Application Priority Data
Mar. 24, 2005  (JP) .............................. 2005-085130
Jan. 25, 2006   (JP) .............................. 2006-015805

(51) Int. Cl.
*F21V 7/04*   (2006.01)
(52) U.S. Cl. .......................... 362/609; 362/628; 362/16
(58) Field of Classification Search .................... 362/3, 362/8, 16, 297, 327, 328, 346, 349, 602, 362/603, 604, 608, 609, 611, 614, 615, 623, 362/625, 626, 628
See application file for complete search history.

(56) References Cited

U.S. PATENT DOCUMENTS

| | | | | |
|---|---|---|---|---|
| 5,485,291 | A | * | 1/1996 | Qiao et al. .................. 362/615 |
| 6,078,752 | A | | 6/2000 | Tenmyo |
| 6,435,685 | B2 | * | 8/2002 | Matsushita .................. 362/608 |

FOREIGN PATENT DOCUMENTS

| | | |
|---|---|---|
| EP | 0729059 | 8/2003 |
| JP | 8234277 | 9/1996 |
| JP | 10115852 | 5/1998 |

* cited by examiner

*Primary Examiner*—Y My Quach Lee
(74) *Attorney, Agent, or Firm*—Pamela R. Crocker

(57) ABSTRACT

A compact or thin lighting system is provided. Light fluxes emitted from an arc tube 22 are made to enter from a light reception face c1 of an optical member 24 from a reflector 24 and to emit from a light emission face c3 orthogonal to the light reception face c1. Light fluxes entering the light emission face c3 at a small angle are reflected and turned to a main reflection face c2, and then emitted from the light emission face c3. By using total internal reflection of the light emission face, the size and thickness can be decreased.

14 Claims, 22 Drawing Sheets

(mm)

| LIGHTING SYSTEM | 20 | 30 | 40 | 50 |
|---|---|---|---|---|
| $\phi d=$ | 2 | 2 | 2 | 2 |
| $x1=$ | 1.19 | 1 | 1 | 1.05 |
| $x2=$ | 1.47 | 2.73 | 1.38 | 0.04 |
| $x3=$ | 0.84 | 0.09 | 0.89 | 0.08 |
| $x4=$ | 0.18 | 0.69 | — | — |
| $y1=$ | 1.94 | 2.32 | 2.94 | 1.82 |
| $y2=$ | 2.36 | 3.36 | 6.6 | 1.98 |
| $y3=$ | 5.51 | 7.97 | — | 3.61 |
| $\alpha=$ | 65° | 30° | 69° | — |
| $\beta 1=$ | 54.89° | 53.96° | 56.69° ($\beta$) | 58.23° |
| $\beta 2=$ | 53.67° | 58.5° | — | 57.5 |
| $\gamma=$ | 90° | 90° | 90° | 90° |
| $\delta=$ | — | — | 87.85° | — |
| $R1=$ | 19.23 | 10 | 46.41 | 10 |
| $R2=$ | 34.48 | INFINITE | INFINITE | INFINITE |

Fig. 4

LIGHTING SYSTEM

FIELD OF THE INVENTION

The present invention relates to a lighting system, particularly to an arrangement and a shape of an optical system.

BACKGROUND OF THE INVENTION

Lighting systems are known which condenses light fluxes diffused from an emission light source in one direction. For example, a photography apparatus such as a camera is provided with a lighting system for illuminating an object at the time of photography. Efforts to develop cameras have recently progressed from development of cameras for recording data in a conventional film to development of cameras for storing a photographed image as electronic data. Because digital cameras do not use film, the roll of film is not a factor restricting the external size and shape of the camera, making possible to further downsize the digital camera. Therefore, to allow digital cameras to achieve their potential, downsizing of the lighting system is also desired.

Japanese Patent No. 3,372,785 discloses a lighting system for condensing light fluxes from a light source such as a flash discharge tube by a light guide member; and Japanese Patent No. 3,437,309 discloses a lighting system for guiding light fluxes from a light source by a light guide member and condensing, reflecting: inflecting, and emitting the light fluxes.

SUMMARY OF THE INVENTION

Because the external dimensions of a digital camera are not restricted by the size of a roll of film as described above, digital cameras can be made remarkably smaller, particularly decreased in thickness. Downsizing is also desired for other photographing apparatuses. In the case of the lighting system disclosed in the above-noted Japanese Patent No. 3,372,785, a long light guide member is set in the direction heading for an object, which is not well suited to decreasing the thickness of the unit body. In the case of the lighting system disclosed in Japanese Patent No. 3,437,309, a technique for changing the direction of a light flux by a light guide member is disclosed. However, because the light guide member is long, it is difficult to downsize such a lighting system.

The present invention advantageously provides a lighting system for a camera or the like and well-suited downsizing.

A lighting system of the present invention has an optical member including a light reception face for receiving a light flux from a light source and a main light reflection face for reflecting the received light flux toward an object. The optical member further includes a light emission face which directs light fluxes directly incoming from the light reception face towards a main reflection face through total internal reflection, and transmits light directly incoming from the main light reflection face such that the light is emitted towards the object. By using the total internal reflection of the emission face and thereby directing light fluxes to the main reflection face, it is possible to downsize the optical member.

Furthermore, in a cross-sectional plane which is orthogonal to both the light reception face and the light emission face, it is possible to configure the angle formed between the light reception face and the light emission face to be greater than or equal to 85° and less than or equal to 95°, and thereby it is possible to decrease the thickness of the lighting system in the axis direction of a light flux emitted from the light emission face.

The shape of the reflector may be a shape having a semicircular arc portion formed at the opposite side to the light reception face, a first linear portion formed between one end of the semicircular arc portion and the light emission face, and a second linear portion formed between the other end of the semicircular arc portion and the main reflection face about a light source. Particularly, it is possible to make an angle formed between the light reception face and the first linear portion range of greater than or equal to 30° and less than or equal to 75°. When the setting angle of the first linear portion is kept in the above range, it is possible to direct a light flux reaching the first linear portion of the reflector from the light source to the main reflection face or light emission face and a light flux directed to the light emission face head for the main reflection face in accordance with total internal reflection. Moreover, it is possible to direct the light fluxes reaching the first linear portion among the light fluxes reflected from the second linear portion of the reflector to the main reflection face or light emission face. On the light emission face, it is possible to make the light fluxes head for the main reflection face through total internal reflection

BRIEF DESCRIPTION OF THE DRAWINGS

FIG. 4 is an illustration showing dimensions of various portions of each lighting system of the present embodiment;

DETAILED DESCRIPTION OF THE INVENTION

Figure 1:
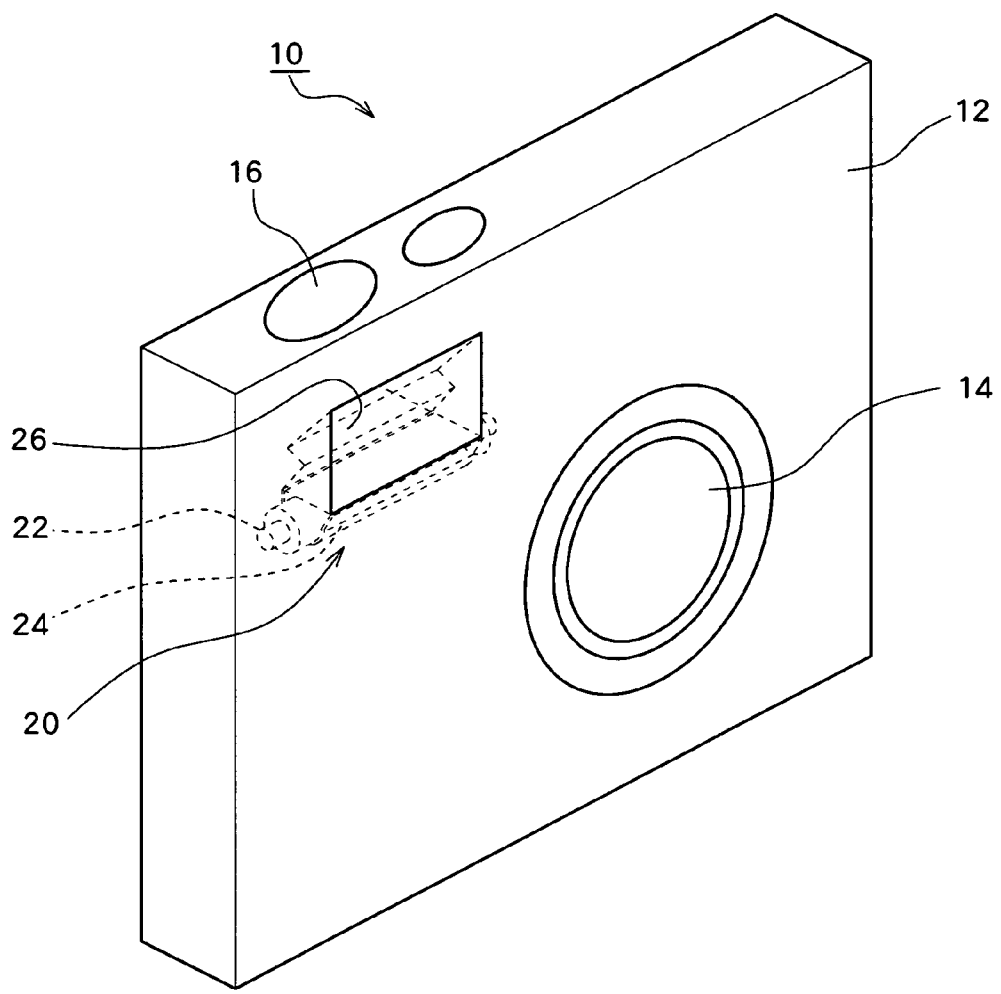
FIG. 1 is a perspective view showing the appearance of a digital camera for which a lighting system of the present embodiment is provided.

Embodiments of the present invention are described below by referring to the accompanying drawings. FIG. 1 is an illustration showing the appearance of a digital camera 10. An optical photography system 14 is set to almost the central portion of a body 12 and operation switches including a shutter button 16 are arranged at the upside of the body 12. The body 12 is provided with a lighting system 20 for illuminating an object. The lighting system 20 is a so-called flash apparatus for generally emitting a flash and this embodiment also uses the flash apparatus, although a system for continuously illuminating an object may be used. The lighting system 20 has an arc tube 22 for emitting a flash and includes a reflector 24 for directing light flux emitted from the arc tube towards a direction (for example, upward in FIG. 1) orthogonal to the direction heading towards the object. By directing the light flux upward, inflecting it, and making it head for the front side, it is possible to decrease the depth-directional dimension. Although, in the example of this embodiment, a light flux is first directing upward, the direction of the light flux may be decided in consideration of other components of a camera, and any direction can be used as long as the direction is a direction orthogonal to the depth direction of a thin rectangular parallelepiped of a camera body.

Figure 2:
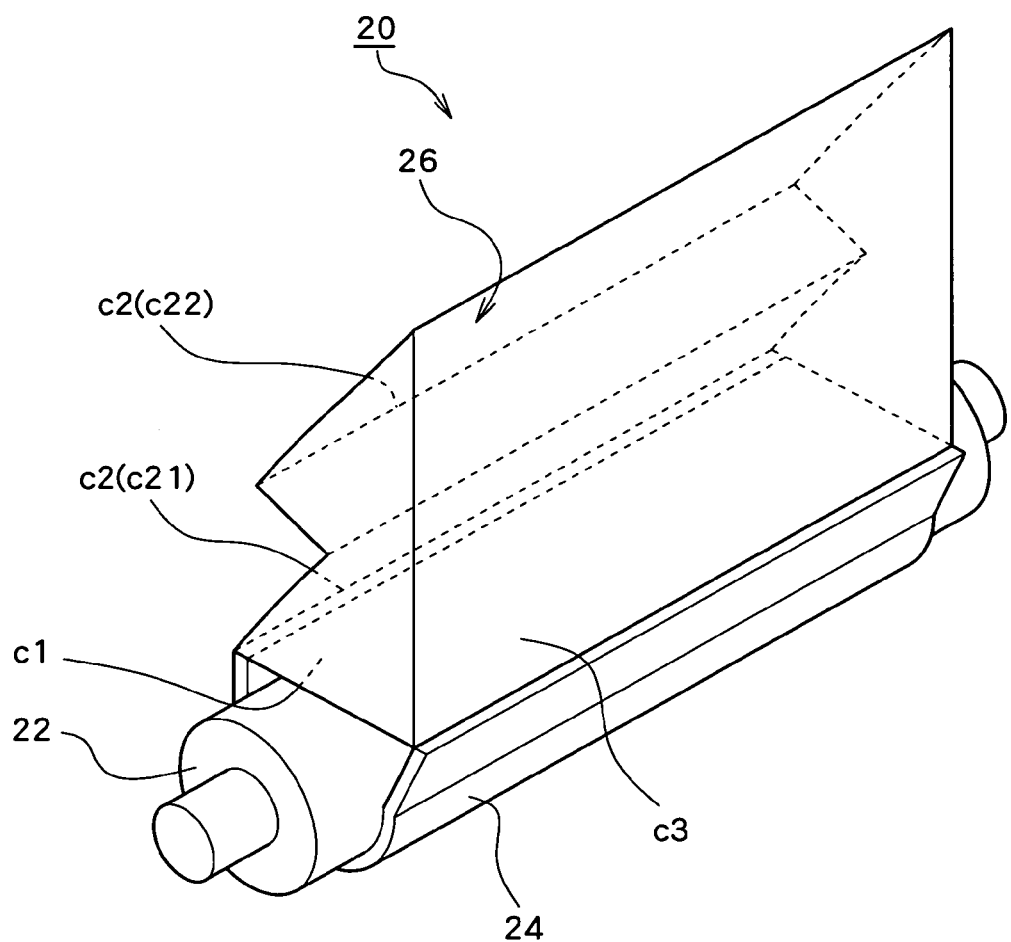
FIG. 2 is a perspective view showing the appearance of a lighting system 20 of the present embodiment.

FIG. 2 is an enlarged view of the lighting system 20. The arc tube 22 is cylindrical and its side is enclosed by the reflector 24 and optical member 26. The optical member 26 faces the arc tube 22 and has a light reception face c1 for receiving a light flux emitted from the arc tube, a light emission face c3 facing an object to emit a light flux, and a main reflection face c2 for reflecting a light flux received from the light reception face c1 and making the light flux head for the light emission face. The optical member 26 can be formed from glass or a transparent resin such as acrylic resin, and the main reflection face c2 is formed by depositing a metal having a high reflectance. The side is also metallized. The side can be formed as a plane or a curved surface. Moreover, the main reflection face c2 includes two reflection faces c21 and c22 as shown in FIG. 2.

Figure 3:
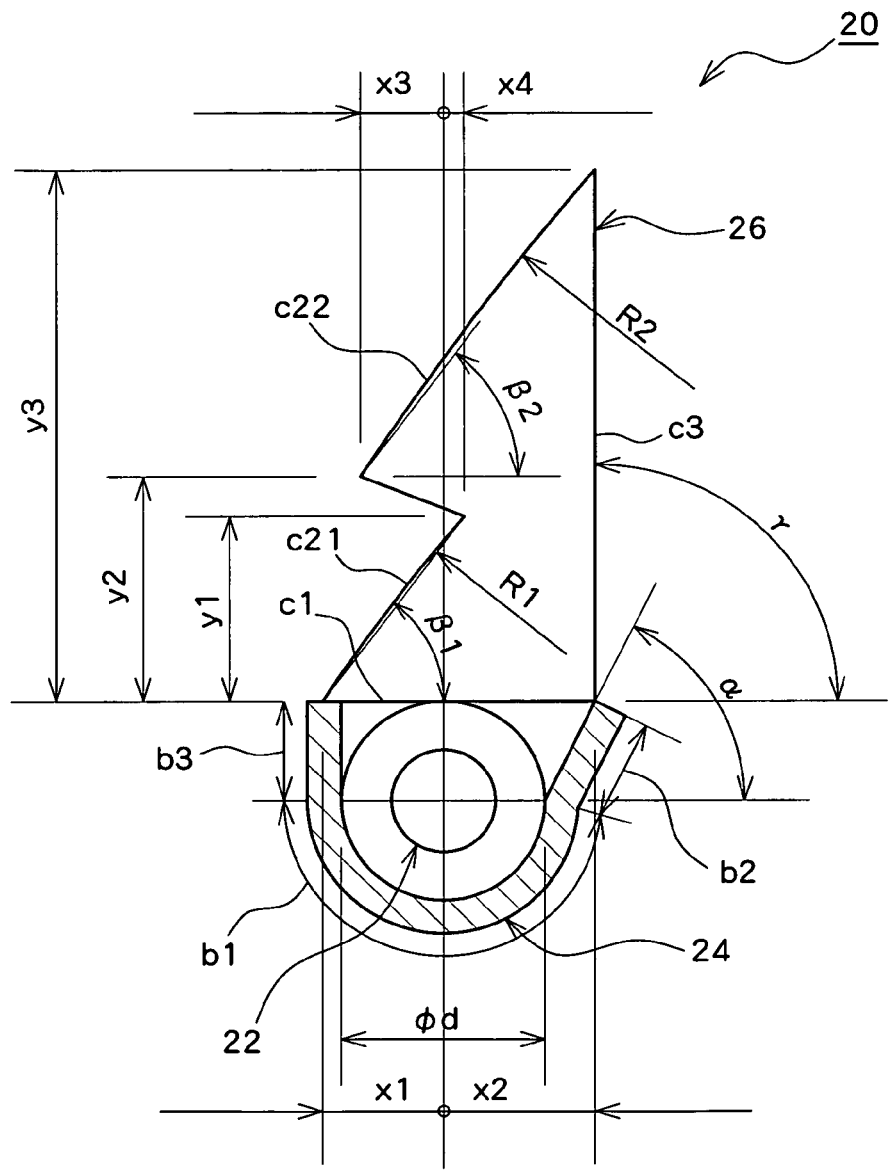
FIG. 3 is a sectional view showing dimensions of various portions of the lighting system 20.

FIG. 3 is an illustration showing the shape of the lighting system 20 at a cross section orthogonal to the axis of the cylinder of the arc tube 22. Components of the lighting system 20 have a constant cross section in the axis direction of the arc tube 22. The light reception face c1 and light emission face c3 of the optical member 26 are orthogonal to the cross section. The dimensions of each portion shown in FIG. 3 are shown in FIG. 4. The refractive index of the optical member 26 is 1.49.

The arc tube 22 is a cylindrical shape having a diameter of d. The reflector 24 comprises the illustrated three portions b1, b2, and b3. A portion of the umbrella 24 covering a semicircular portion at the far side of the arc tube 22 from the optical member 26, is the circular arc portion b1, a portion located between a right end of the circular arc portion b1. The light emission face c3 is the first linear portion b2, and a portion located between the other end of the circular arc portion b1 and the reflection face c2 is the second linear portion b3. The circular arc portion b1 reflects a light flux emitted from the arc tube 22 and advancing away from the optical member 26 and turns the light flux to the center of the arc tube 22. This light flux passes through the center of the arc tube 22 and then heads for the optical member 26. Because the circular arc portion b1 is semicircular, one of the light fluxes heading for the opposite-direction along one diameter emitted from the arc tube is reflected from the circular arc portion b1 of the reflector and follows the same path as the other light fluxes. Therefore, it is understood that it is not necessary to individually consider the light flux reflected from the circular arc portion b1, but it is necessary to consider only the light flux applied to the side at which the circular arc portion b1 is not set, that is, only the light flux applied toward the semicircle at the upside in FIG. 3. Therefore, description of the light flux heading for the circular arc portion b1 is hereafter omitted.

The first and second linear portions b2 and b3 respectively have a function for reflecting light fluxes not directly entering the optical member 26, among light fluxes emitted upward and making them enter the optical member 26. The second linear portion b3 is set almost orthogonally to the light reception face c1. However, the first linear portion b2 is slightly tilted in the direction in which the opening of the reflector 24 is expanded. In the example of this embodiment, an angle α formed between the first linear portion b2 and the light reception face c1 is 65°.

The main reflection face c2 of the optical member 26 is saw-toothed, on which two reflection faces are formed. The reflection face at the side close to the light reception face c1 is called the first reflection face c21 and the other reflection face is called the second reflection face c22. Each of these reflection faces is a concave surface, and are respectively defined by drawing an arc with a radius of 19.23 mm (R1) on the reflection face c21 and 34.48 mm (R2) on the reflection face c22. Moreover, these reflection faces have an angle of 54.89° (β1) and 53.67 (β2) from the light reception face c1. These inclinations are shown by an angle formed between a straight line for passing through both end points of each reflection face drawing a circular arc and the light reception face c1.

Figure 5:
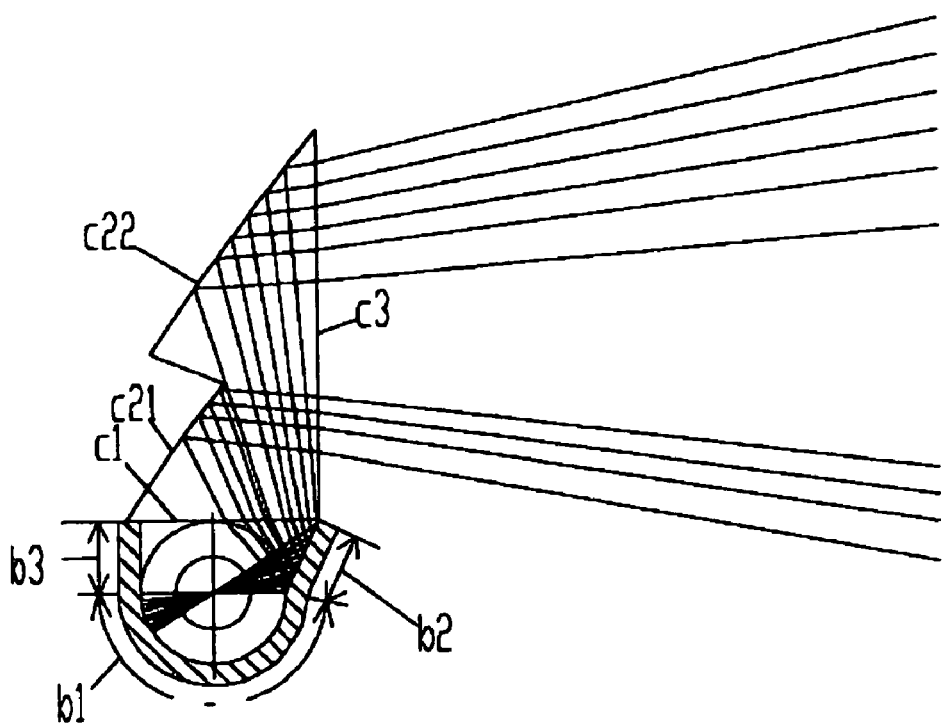
FIG. 5 is an illustration showing paths of light fluxes of the lighting system 20.

FIGS. 5 to 8 are illustrations showing paths of light fluxes emitted from the arc tube 22. FIG. 5 is an illustration showing paths of light fluxes directly reaching the first linear portion b2 of the reflector 24 from the arc tube 22. The first linear portion b2 of the reflector is set by being tilted by 65° as described above. All light fluxes reflected here enter the optical member from the light reception face c1 of the optical member and reach the main reflection face c2. The light fluxes are reflected from the main reflection face and emitted from the light emission face c3. Thus, all light fluxes emitted from the arc tube and directly reaching the first linear-portion b2 enter the optical member 26 and follow paths from which the light fluxes are emitted, therefore they do not follow paths through which they do not enter the optical member 26 and return to the reflector.

Figure 6:
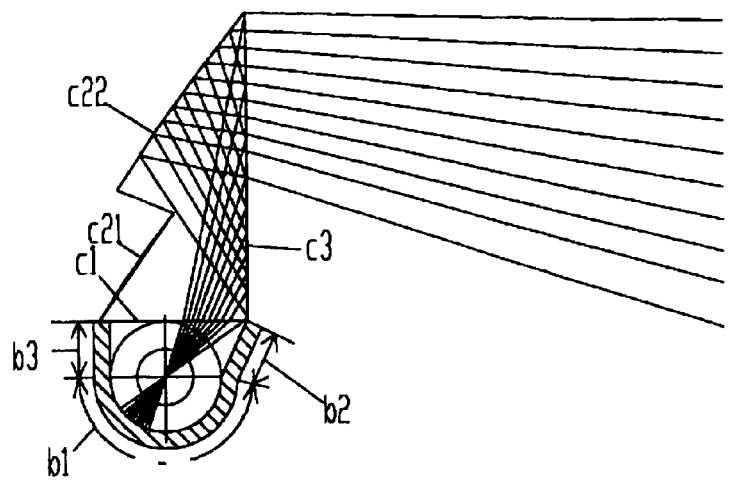
FIG. 6 is an illustration showing paths of light fluxes of the lighting system 20.

FIG. 6 is an illustration showing paths of light fluxes directly reaching the light emission face c3 of the optical member 26 from the arc tube 22. The light passing through the light reception face c1 of the optical member 26 from the arc tube 22 and directly reaching the light emission face c3 is reflected from this face c3 and reaches the second reflection face c22 of the main reflection face. After reflecting the light from the light emission face c3 and then from the main reflection face c2 so that the light is emitted, it is possible to turn light fluxes to the front face, that is, an object.

Figure 7:
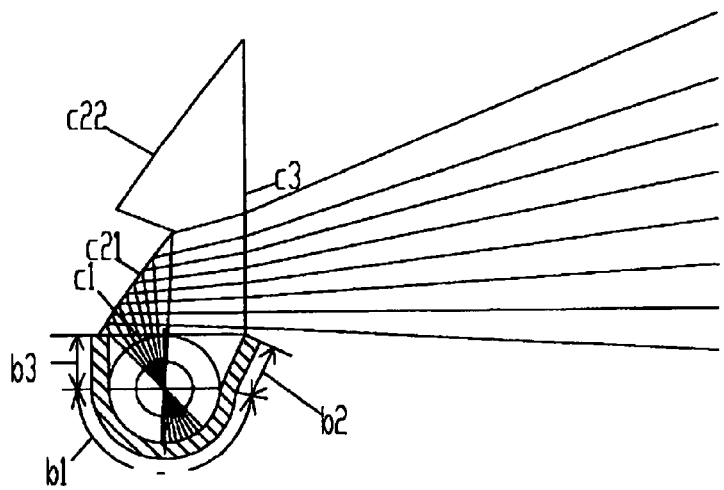
FIG. 7 is an illustration showing paths of light fluxes of the lighting system 20.

FIG. 7 is an illustration showing paths of light fluxes directly reaching the first reflection face c21 of the optical member 26. All these light fluxes are reflected from the first reflection face c21, then head for the light emission face c3, enter the light emission face at almost right angle, and then are emitted. After the fluxes are reflected from the first reflection face c21, they do not return to the light reception face c1 and it is possible to efficiently guide the light flux to the light emission face c3 without being emitted from the light reception face c1.

Figure 8:
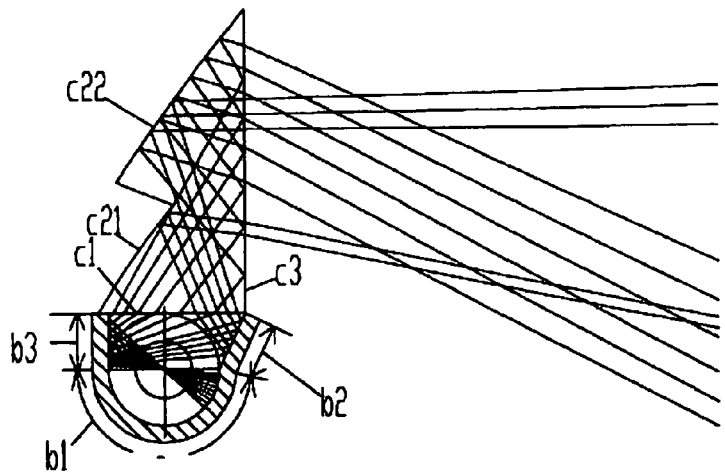
FIG. 8 is an illustration showing paths of light fluxes of the lighting system 20.

FIG. 8 is an illustration showing-paths of light fluxes directly reaching the second linear portion b3 of the reflector from the arc tube 22. Among the light fluxes reflected from the second linear portion b3, light fluxes incoming from the light reception face c1 of the optical member directly reach the light emission face c3. The upper end of the first reflection face c21 is fixed to a position which does not interrupt these light fluxes. The light fluxes reaching the light emission face c3 are reflected from the face c3, head for the main reflection face c2, are reflected from the face c2, and return to the light emission face c3 again and are emitted. Moreover, light fluxes reaching the first linear portion b2 among the light fluxes reflected from the second linear portion b3 of the reflector are efficiently reflected toward the optical member 26 because the linear portion b2 is set with an inclination. Light fluxes reflected from the first linear portion b2 and entering the optical member reach the main reflection face c2, are reflected from the face c2, and are emitted from the light emission face c3.

The configuration described above makes it possible to efficiently apply light fluxes emitted from the arc tube 22 toward an object by using total internal reflection of the light emission face c3 of the optical member 26.

While the angle γ formed by the light emission face c3 with respect to a line extended from the light reception face c1 is 90° in the above-described embodiments as shown in FIGS. 3 and 4, this angle need not be limited to 90°. When the refractive index of the optical member 26 is given by n, the light emission face c3 totally reflects the light directly incoming from the arc tube 22 when the following condition is satisfied:

γ<180−sin$^{-1}$(1/n)

As the refractive index is typically n>1.48, the above condition is satisfied when γ is less than or equal to 95°. Accordingly, γ may be selected from within the range defined by 85°≦γ≦95°, and more preferably from within the range defined by 88°≦γ≦92°. By setting γ to have a value within this range, total internal reflection can be achieved, thereby realizing efficient light reflection to the main reflection face c2. With this arrangement, the configuration of the optical member 26 and the overall lighting system 20 can be simplified, enabling downsizing. It should be noted that the above-noted values of γ can be similarly employed in lighting systems 30, 40, and 50 described below.

Figure 9:
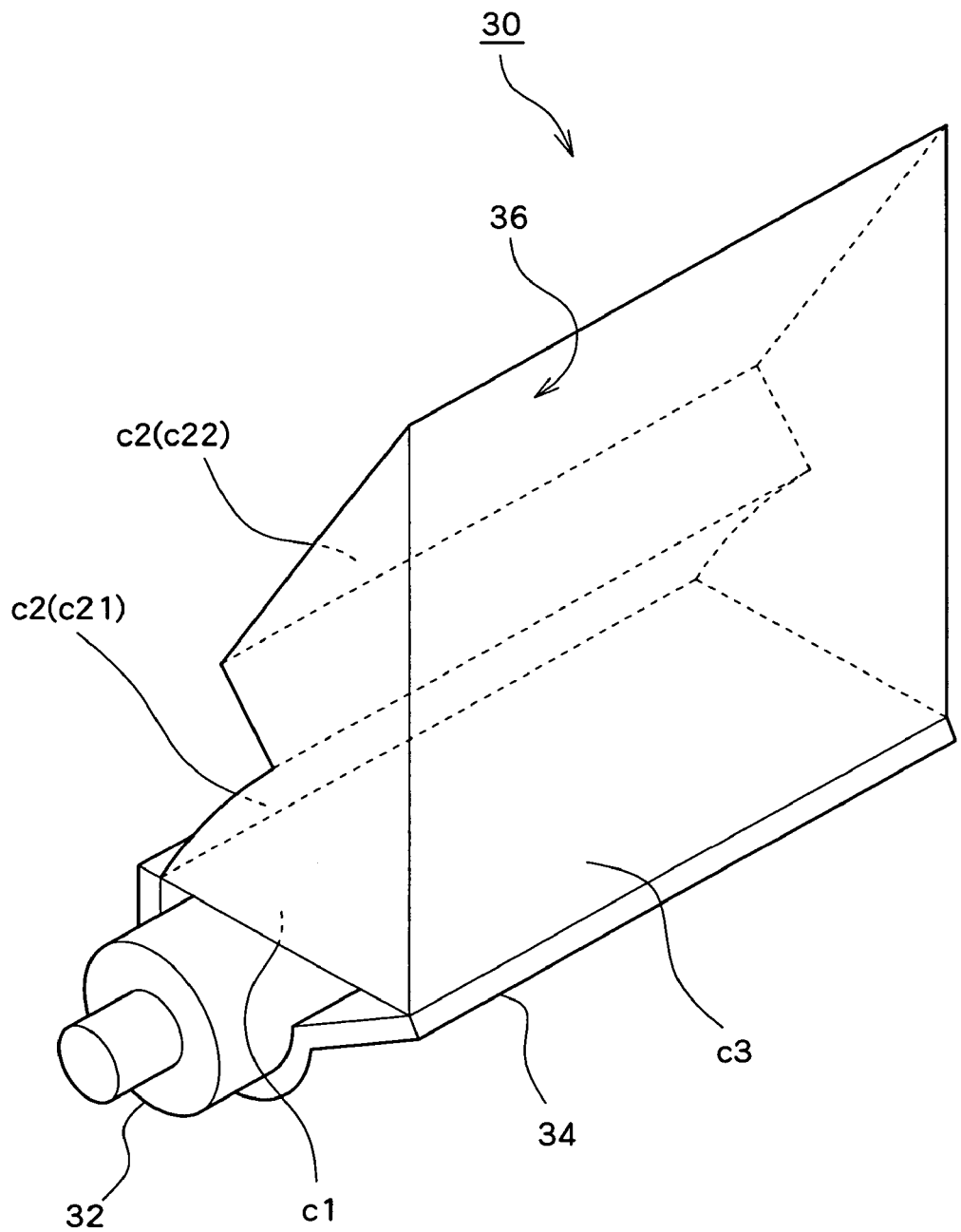
FIG. 9 is a perspective view showing the appearance of a lighting system 30 of another embodiment.

FIG. 9 is an enlarged view showing a lighting system 30, a further embodiment of the present invention. The lighting system 30 can be a component of a digital camera, similarly as with the above-described lighting system 20. An arc tube 32 is the same as the above-described arc tube 22. A reflector 34 has a shape similar to the above-described reflector 24 and has a circular arc portion b1 and first and second linear portions b2 and b3. However, the detailed dimensions of the lighting system 30 are different from those of the lighting system 20. FIG. 4 shows dimensions of various portions. An optical member 36 also has a light reception face c1, main reflection face c2, and light emission face c3. Moreover, the main reflection face includes two reflection faces c21 and c22 and has a shape similar to the above-described optical member 26, although detailed dimensions are different. FIG. 4 shows dimensions of various portions.

Figure 10:
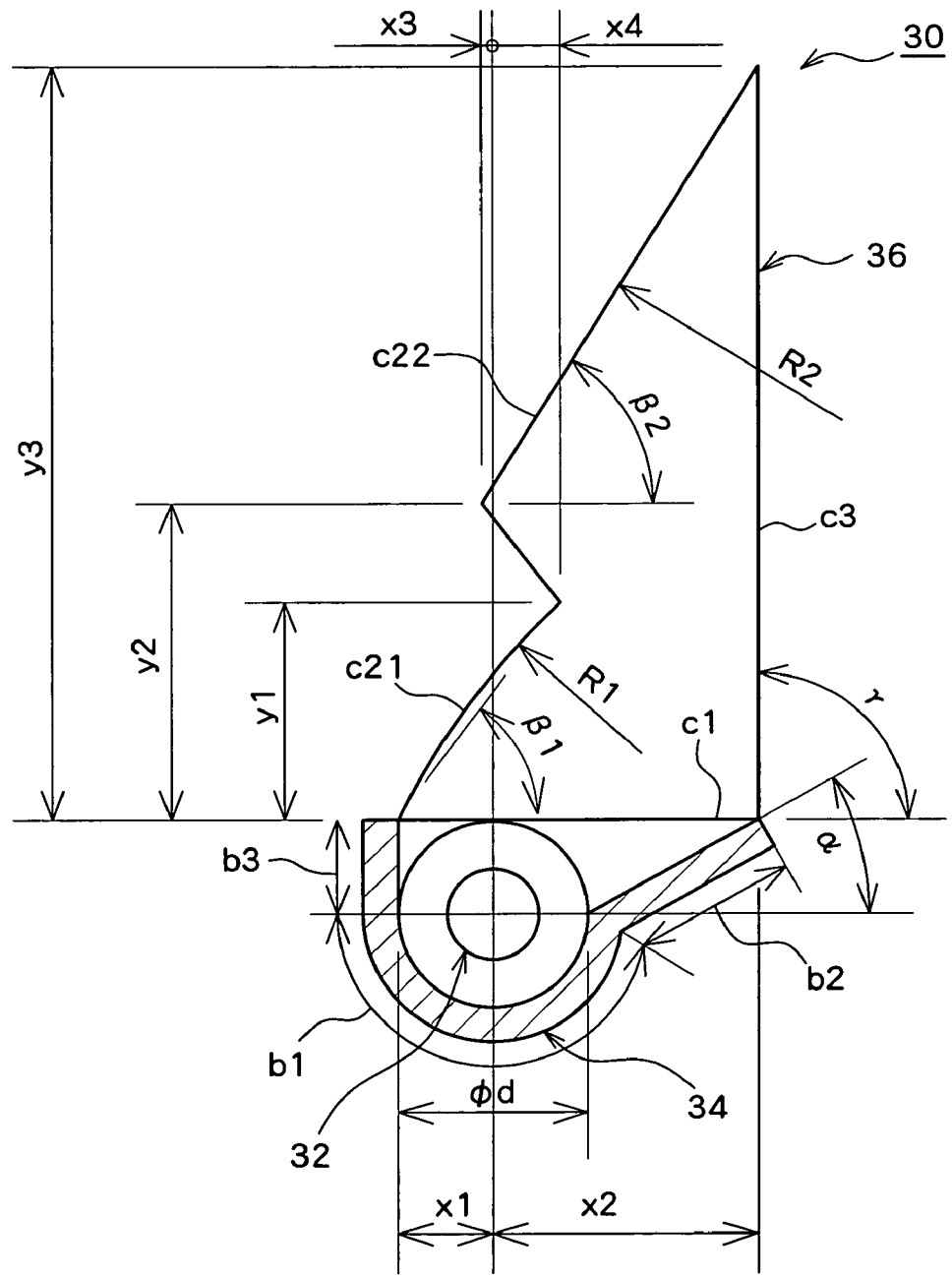
FIG. 10 is a sectional view showing dimensions of various portions of the lighting system 30.

FIG. 10 is an illustration showing the shape of a lighting system 30 at a cross section orthogonal to the axis of an arc tube similar to FIG. 3. Members of the lighting system 30 have a constant cross section in the axis direction of the arc tube 32. The refractive index of the optical member 36 is also 1.49.

The reflector 34 is constituted of illustrated three portions b1, b2, and b3. The portion covering the semicircular portion of the far side of the arc tube 32 from the optical member 36 is the circular arc portion b1, the portion located between the right end of the circular arc portion b1 and the light emission face c3 is the first linear portion b2, and the portion located between the other end of the circular arc portion b1 and the reflection face c2 is the second linear portion b3. The function of the circular arc portion b1 is the same as that of the previously-described reflector 24. Its description will not be repeated. The first and second linear portions b2 and b3 respectively have functions for reflecting light fluxes not directly entering the optical member 36 among light fluxes emitted upward and making the former light fluxes enter the optical member 36. The second linear portion b3 is set almost orthogonally to the light reception face c1. However, the first linear portion b2 is tilted in the direction in which the opening of the reflector 34 expands. In the example of this embodiment, an angle α formed between the first linear portion b2 and the light reception face c1 is 30°.

The main reflection face c2 of the optical member 36 is serrated on which two reflection faces are formed. A reflection face close to the light reception face c1 is a first reflection face c21 and the other reflection face is a second reflection face c22. The first reflection face c21 is a concave face by slightly drawing an arc. Its radius is 10 mm (R1). The radius of the reflection face c22 is infinite, that is, the face c22 is a plane. Moreover, these reflection faces have angles of 53.96° (β1) and 58.5° (β2) from the light reception face c1. These inclinations are respectively shown by an angle formed between the straight line passing through both end points of a reflection face drawing a circular arc and the light reception face c1.

Figure 11:
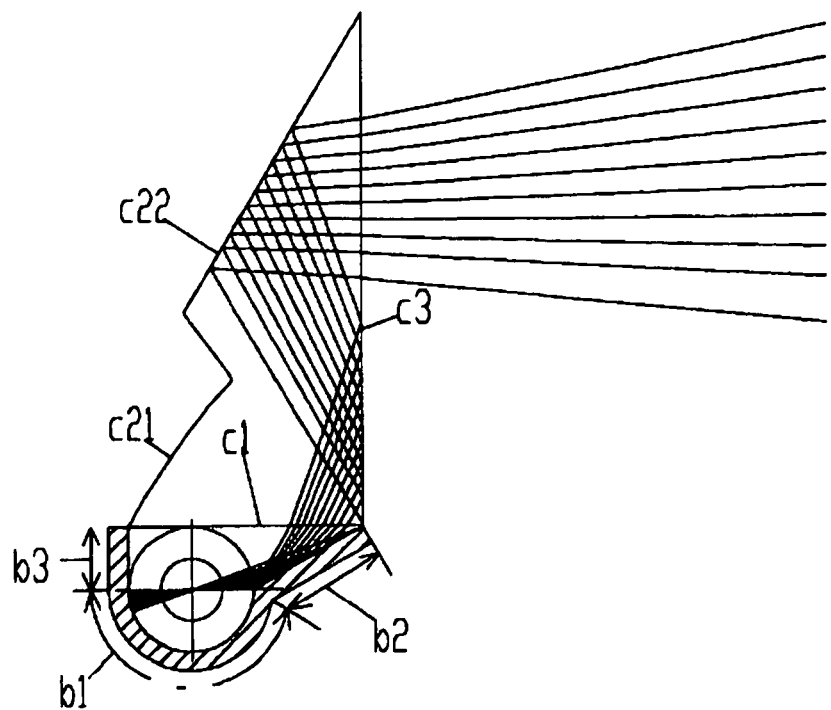
FIG. 11 is an illustration showing paths of light fluxes of the lighting system 30.

FIGS. 11 to 14 are illustrations showing paths of light fluxes emitted from the arc tube 32. FIG. 11 is an illustration showing paths of light fluxes directly reaching the first linear portion b2 of the reflector 34 from the arc tube 32. The first linear portion b2 of the reflector is tilted by 30° as described above. All of these light fluxes reflected from the first linear portion b2 enter the optical member 36 from the light reception face c1 of the optical member and reach the light emission face c3. The light fluxes are reflected from the light emission face c3 a, head for the main reflection face c2, are reflected from the main reflection face c2, returned to the light emission face c3, and emitted. Thus, all the light fluxes emitted from the arc tube and directly reaching the first linear portion b2, enter the optical member 36 and follow paths from which the light fluxes are emitted, therefore; they do not follow paths through which they don't enter the optical member 36 and return to the reflector again.

Figure 12:
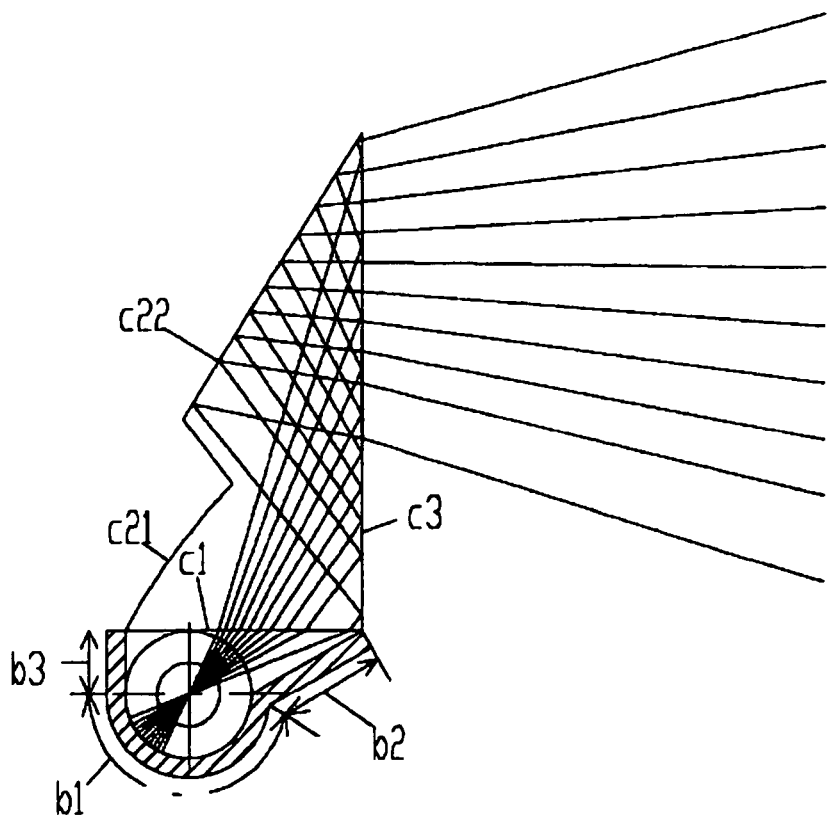
FIG. 12 is an illustration showing paths of light fluxes of the lighting system 30.

FIG. 12 is an illustration showing paths of light fluxes directly reaching the light emission face c3 of the optical member 36 from the arc tube 32. Light fluxes passing through the light reception face c1 of the optical member 36 and directly reaching the light emission face c3 are reflected from the face c3, and reach the second reflection face c22 of the main reflection face, where they are reflected from the second reflection face c22, returned to the light emission face c3, and emitted from the face c3. Because of reflecting the light fluxes from the light emission face c3, once reflecting them from the main reflection face c2, and emitting them, it is possible to direct the light fluxes to the front face, that is, towards an object.

Figure 13:
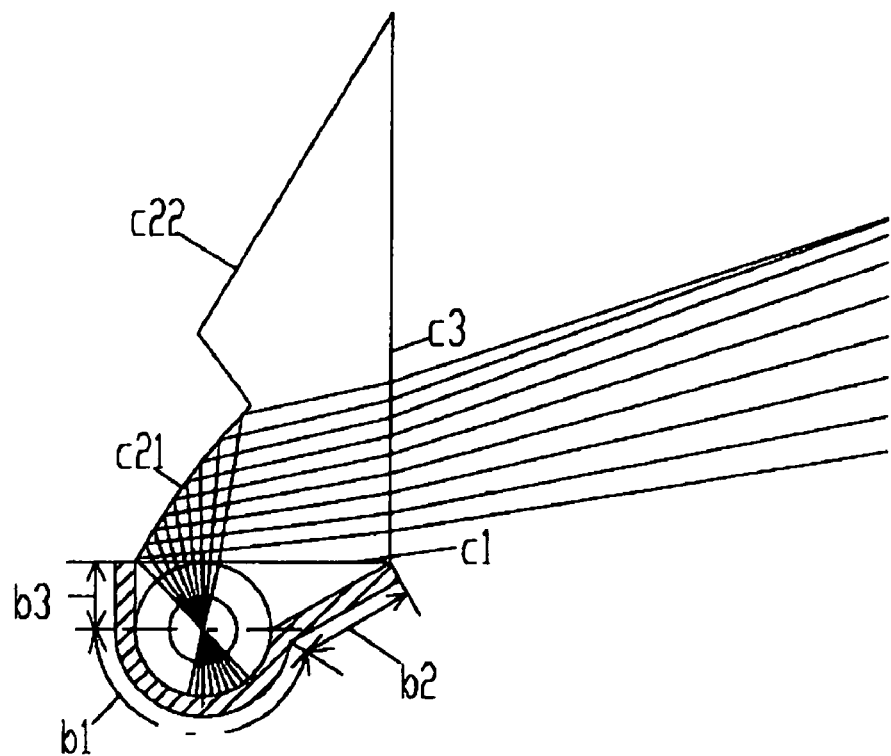
FIG. 13 is an illustration showing paths of light fluxes of the lighting system 30.

FIG. 13 is an illustration showing paths of light fluxes directly reaching the first reflection face c21 of the optical member 36 from the arc tube 32. All these light fluxes are reflected from the first reflection face c21, head for the light emission face c3, enter the light emission face at almost a right angle, and then are emitted. After the light fluxes are reflected from the first reflection face c21, they don't return to the light reception face c1, and they are not emitted from the face c1. Therefore, it is possible to efficiently guide the light fluxes to the light emission face.

Figure 14:
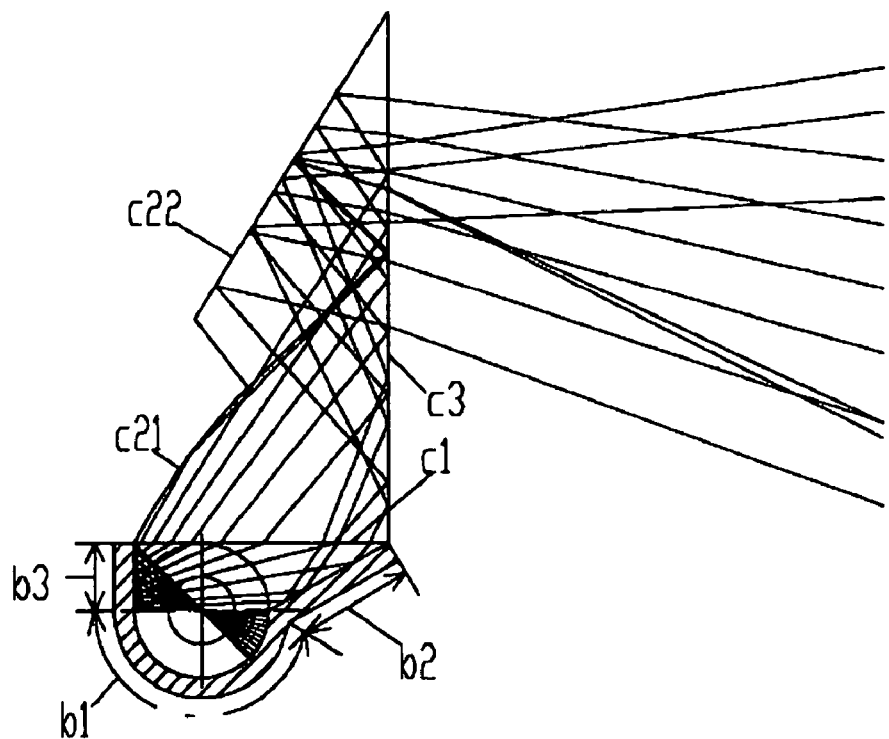
FIG. 14 is an illustration showing paths of light fluxes of the lighting system 30.

FIG. 14 is an illustration showing paths of light fluxes directly reaching the second linear portion b3 of the reflector from the arc tube 32. Light fluxes incoming from the light reception face c1 of the optical member among light fluxes reflected from the second linear portion b3 reach the light emission face c3 directly or by being reflected from the first reflection face c21. The light fluxes reaching the light emission face c3 are reflected from the face c3 and head for the main reflection face c2, where they are reflected and returned to the light emission face c3 and then emitted. Moreover, because light fluxes reaching the first linear portion b2 among the light fluxes reflected from the second linear portion b3 of the reflector are arranged by having an inclination, they are efficiently reflected toward the optical member 26. These light fluxes reflected from the first linear portion b2 and entering the optical member reach the light emission face c3, are reflected from the face c3, are reflected from the main reflection face, particularly from the second reflection face c22, and emitted from the light emission face c3.

In the example described above, by using total internal reflection of the light emission face c3 of the optical member 36, it is possible to efficiently apply light fluxes emitted from the arc tube 32 toward an object.

For the lighting systems 20 and 30 described above, examples are described in which angles α of the first linear portions b2 of the reflectors 24 and 34 are 65° and 30°. As shown in FIG. 5, in the lighting system 20, light fluxes directly reaching the first linear portion b2 and reflected head for the main reflection face c2. In the system 30, light fluxes head for the light emission face c3 as shown in FIG. 11. When the angle α takes a value of greater than or equal to 30° and less than or equal to 65°, it is understood that the light fluxes directly reaching the first linear portion b2 from the arc tube reaching—the main reflection face c2 or light emission face c3 and, moreover, that these light fluxes are emitted from the light emission face c3. When the angle α is made less than 30°, the length of the light reception face c1 is increased. Moreover, it is possible to make the angle α greater than 65°. However, when the angle α is greater than 75°, light fluxes reflected from the first linear portion b2 do not head for the light reception face c1, but the number of light fluxes heading for the second linear portion b3 increases, these light fluxes become damping or stray components due to subreflection and loss increases. Therefore, it is preferable to set the angle α in a range of greater than or equal to 30° and less than or equal to 75°.

Moreover, light fluxes reflected from the first linear portion b2 are mainly reflected from the second reflection face c22 and flux distribution control to an object is performed by the face c22. It is preferable to set an angle β2 formed between the second reflection face c22 and the light reception face c1 in a range of greater than or equal to 40° and less than or equal to 70°. Beyond this range, some light fluxes reflected from the second reflection face c22 are reflected from the light emission face c3 and some of the other light fluxes are returned to the light reception face c1, refracted, pass through the face c1, and are emitted to the reflector side, thereby becoming stray light fluxes which increase loss.

Figure 15:
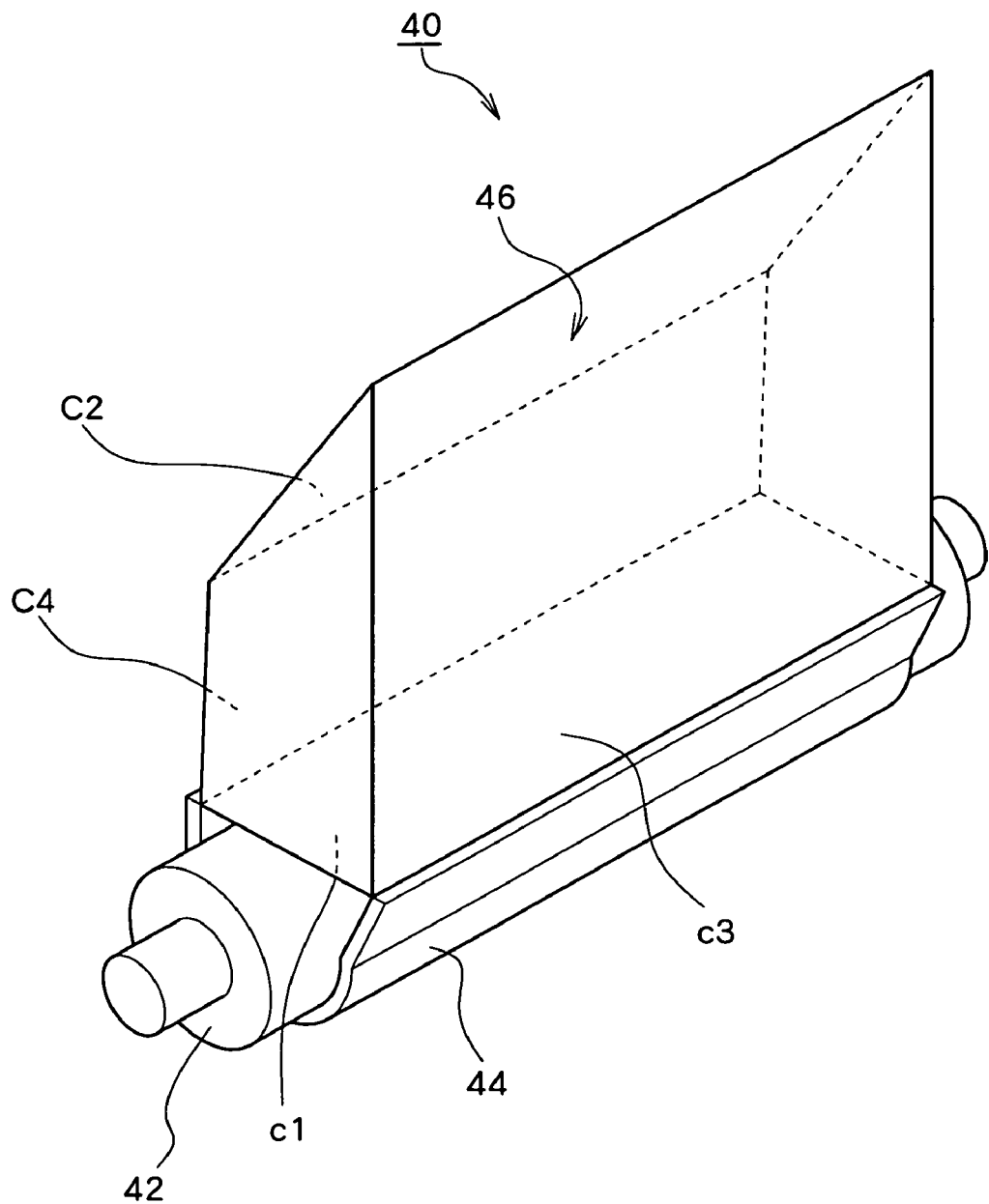
FIG. 15 is a perspective view showing the appearance of a lighting system 40 of still another embodiment.

FIG. 15 is an enlarged view showing a lighting system 40 of still another embodiment. The lighting system 40 can be built in a digital camera similar to the above-described lighting systems 20 and 30. An arc tube 42 is the same as the above-described arc tubes 22 and 32. A reflector 44 has a shape similar to that of the above-described reflector 24 and has a circular arc portion b1 and first and second linear portions b2 and b3 but the umbrella 44 is different from the umbrella 24 in detailed dimensions. FIG. 4 shows dimensions of various portions. An optical member 46 has a light reception face c1, main reflection face c2, and light emission face c3 and moreover has a total internal reflection face c4 between the main reflection face c2 and the light reception face c1. As shown in FIG. 15, the optical member 46 is different from the above-described serrated optical members 26 and 36 but it has an almost trapezoidal sectional form. FIG. 4 shows dimensions of various portions.

Figure 16:
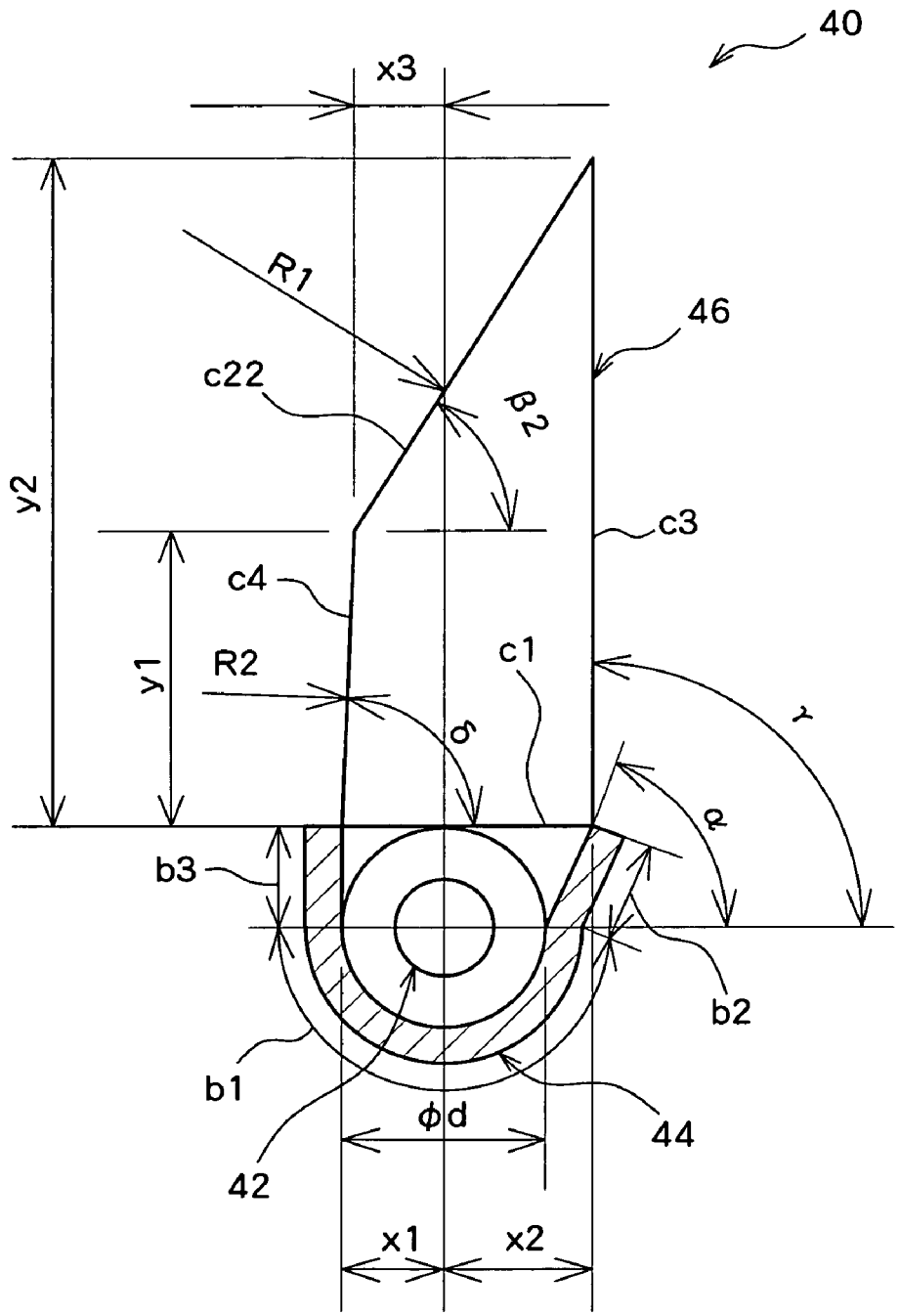
FIG. 16 is a sectional view showing dimensions of various portions of the lighting system 40.

FIG. 16 is an illustration showing the shape of the lighting system 40 at a cross section orthogonal to the axis of the arc tube similar to FIGS. 3 and 10. Members of the lighting system 40 have a constant cross section in the axis direction of the arc tube 42. The refractive index of the optical member 46 is similarly 1.49.

The reflector 44 comprises the illustrated three portions b1, b2, and b3. The portion covering a semicircular portion at the far side of the arc tube 42 from the optical member 46 is the circular arc portion b1, the portion located between an right end of the circular arc portion b1 and the light emission face c3 is the first linear portion b2, and the portion located between the other end of the circular arc portion b1 and the total internal reflection face c4 is the second linear portion b3. The function of the circular arc portion b1 is the same as that of the above-described reflectors 24 and 34 and description will not be repeated. The first and second linear portions b2 and b3 respectively have a function for reflecting light fluxes not directly entering the optical member 46 and making them enter the optical member 46. The second linear portion b3 is set almost orthogonally to the light reception face c1 but it is slightly tilted in the direction in which the opening of the reflector 44 expands. In the case of this embodiment, an angle α formed between the first linear portion b2 and the light reception face c1 is 69°.

The optical member 46 includes the total internal reflection face c4 set almost orthogonally to the main reflection face c2 set diagonally to the light reception face c1. The total internal reflection face c4 is a plane and the reflection face c2 is a convex face having a curvature radius of 46.41 mm. Moreover, an angle from the light reception face c1 of the reflection face c2 is 56.69° (β). This inclination is shown by an angle formed between a straight line for passing through both end points of a reflection face drawing a circular arc and the light reception face c1.

Figure 17:
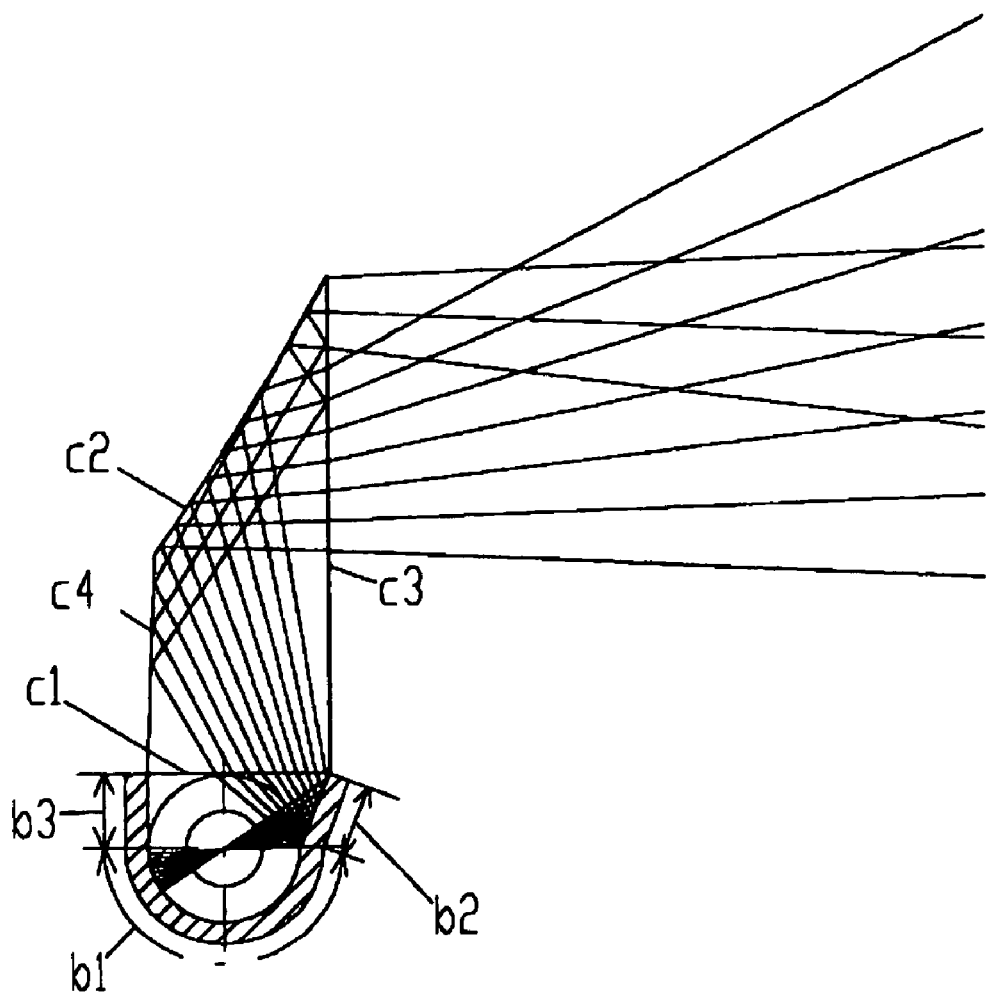
FIG. 17 is an illustration showing paths of light fluxes of the lighting system 40.

FIGS. 17 to 20 are illustrations showing paths of light fluxes emitted from the arc tube 42. FIG. 17 is an illustration showing paths of light fluxes directly reaching the first linear portion b2 of the reflector 44 from the arc tube 42. The first linear portion b2 of the reflector is set by tilting the reflector to 69° as described above, and all light fluxes reflected from the portion b2 enter the optical member 46 from the light reception face c1 of the optical member and reach the main reflection face c2 or total internal reflection face c4. The light fluxes reaching the main reflection face c2 are emitted from the light emission face c3. The light fluxes reaching the total internal reflection face c4 are reflected and head for the light emission face c3, are again reflected from the light emission face c3, and head for the main reflection face c2. Then, they are reflected from the main reflection face c2 and emitted from the light emission face c3. Thus, all light fluxes emitted from the arc tube and directly reaching the first linear portion b2 enter the optical member 46, follow paths from which the light fluxes are emitted. Therefore they do not follow paths to be returned to the reflector again.

Figure 18:
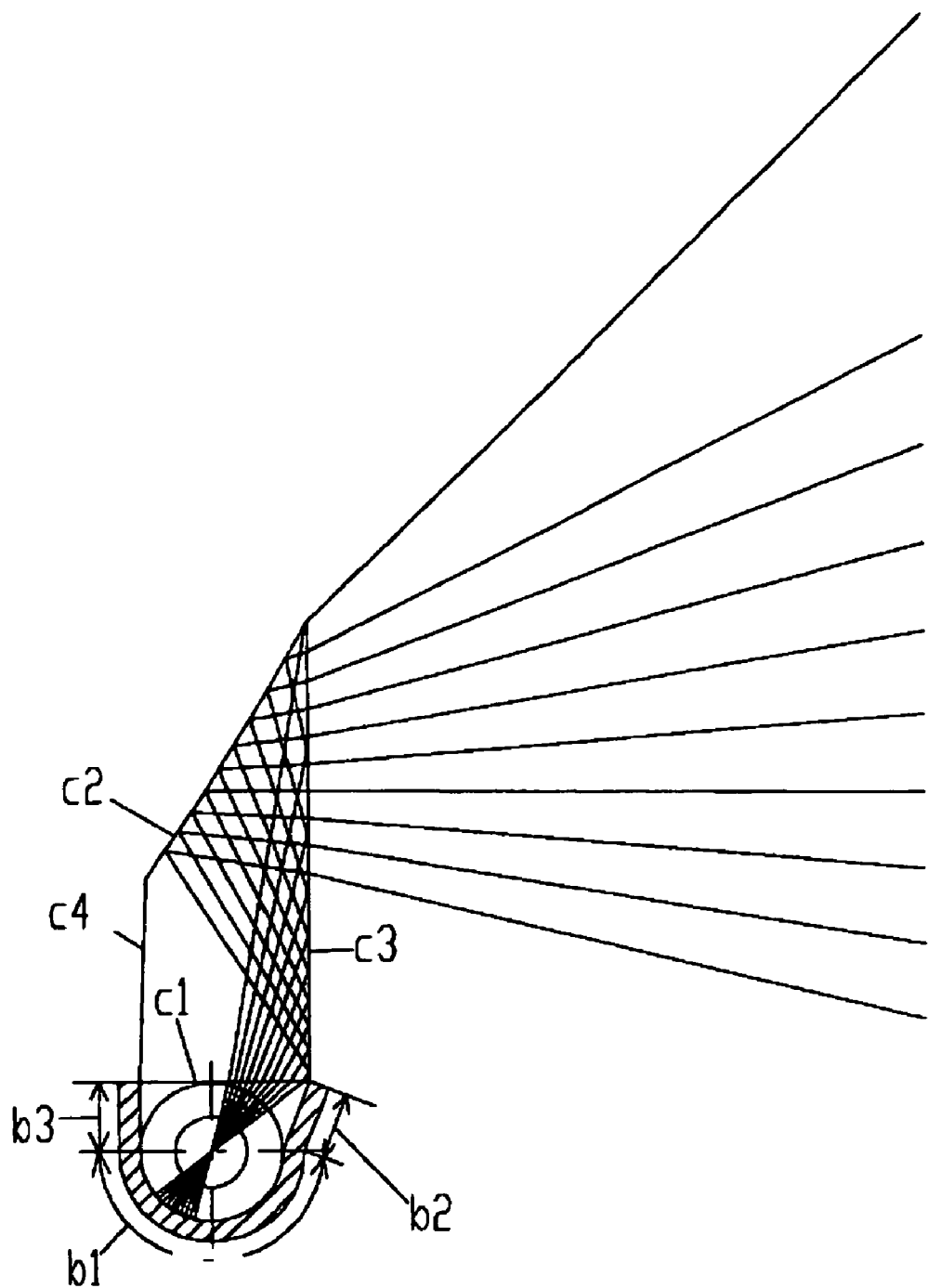
FIG. 18 is an illustration showing paths of light fluxes of the lighting system 40.

FIG. 18 is an illustration showing paths of light fluxes reaching the light emission face c3 of the optical member 46 from the arc tube 42. Light fluxes passing through the light reception face c1 of the optical member 46 and directly reaching the light emission face c3 from the arc tube 42 are reflected from this face c3, reach the main reflection face c2, return to the light emission face c3, and are emitted. Thereby, it is possible to direct light fluxes to the front face, that is, towards an object.

Figure 19:
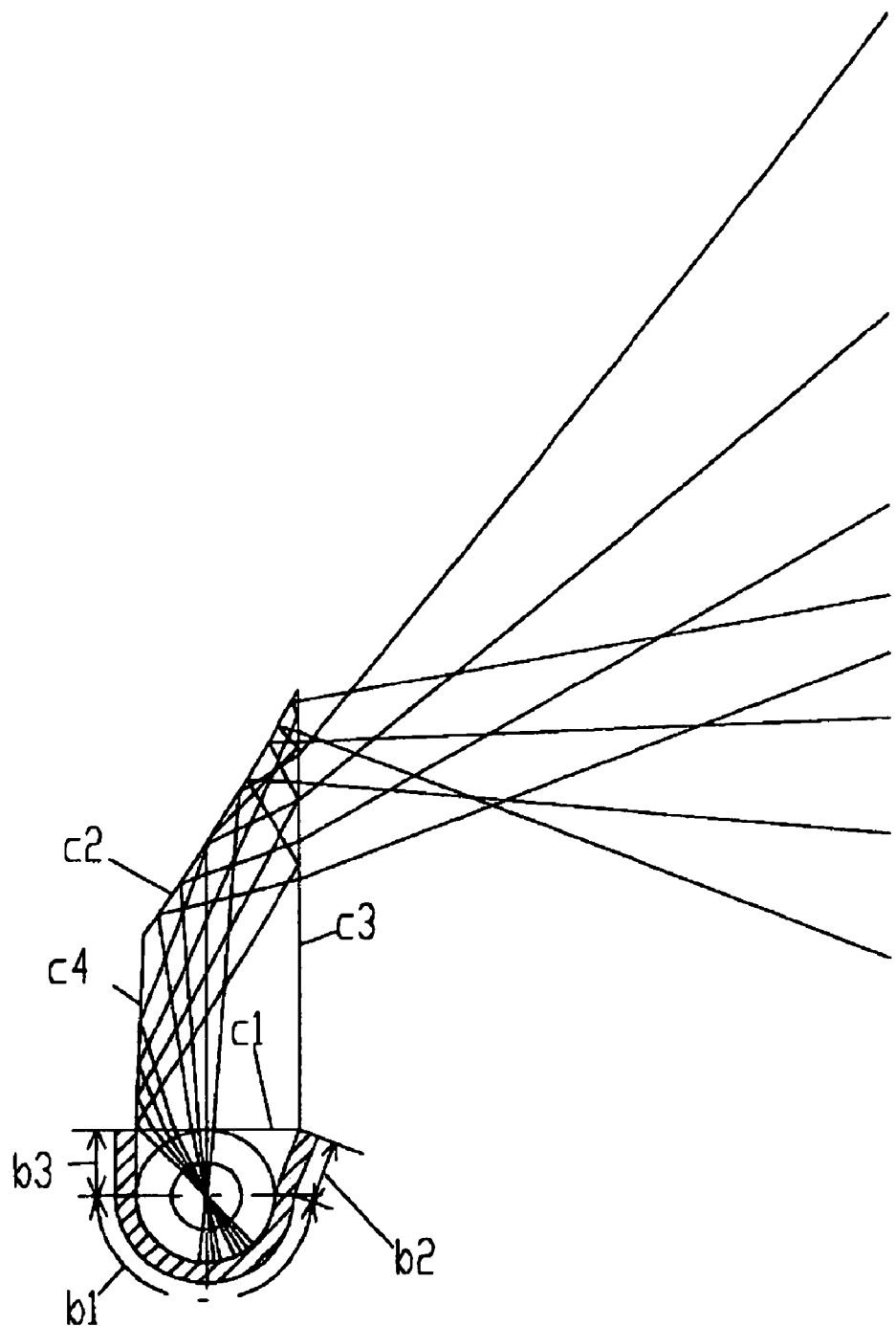
FIG. 19 is an illustration showing paths of light fluxes of the lighting system 40.

FIG. 19 is an illustration showing paths of light fluxes directly reaching the total internal reflection face c4 and main reflection face c2 of the optical member 46 from the arc tube 42. Light fluxes reaching the total internal reflection face c4 are reflected from the face c4, reach the light emission face c3 or main reflection face c2, and are reflected from the light emission face c3 again. The light fluxes reflected from the light emission face c3 and the light fluxes reaching the main reflection face c2 via the total internal reflection face c4 are reflected here and emitted from the light emission face c3. Moreover, light fluxes directly reaching the main reflection face c2 from the arc tube 42 are reflected and emitted from the light emission face c3.

Figure 20:
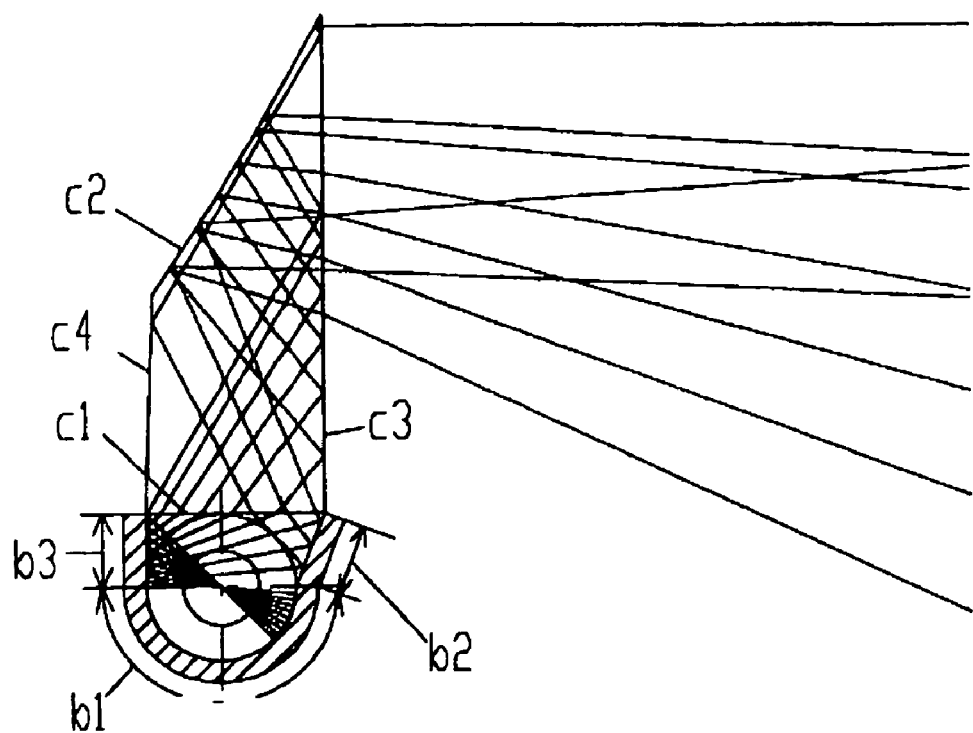
FIG. 20 is an illustration showing paths of light fluxes of the lighting system 40.

FIG. 20 is an illustration showing paths of light fluxes directly reaching the second linear portion b3 of the reflector from the arc tube 42. Light fluxes incoming from the light reception face c1 of the optical member among light fluxes reflected from the second linear portion b3 directly reach the light emission face c3. The light fluxes reaching the light emission face c3 are reflected from the face c3, head for the main reflection face c2, are reflected and returned to the light emission face c3 again, and emitted. Light fluxes reflected from the first linear portion b2 and entering the optical member reach the main reflection face c2 or total reflection face c4, where they reflected and emitted from the light emission face c3.

As described above, by using the total reflection of the light emission face c3 of the optical member 46, it is possible to efficiently apply light fluxes emitted from the arc tube 42 toward an object.

When the angle α is made less than 30°, the length of the light reception face c1 is increased. However, when the angle α is greater than 75°, light fluxes reflected from the first linear portion b2 do not head for the light reception face c1, but the number of light fluxes heading for the second linear portion b3 increases, these light fluxes become damping or stray components due to subreflection and loss increases. Therefore, it is preferable to set the angle α in a range of greater than or equal to 30° and less than or equal to 75°.

It is preferable to set an angle β formed between the second reflection face c22 and the light reception face c1 in a range of greater than or equal to 40° and less than or equal to 70°. Beyond this range, some light fluxes reflected from the second reflection face c22 are reflected from the light emission face c3 and some of the other light fluxes are returned to the light reception face c1, refracted, pass through the face c1, and are emitted to the reflector side, thereby becoming stray light fluxes which increase loss.

Because the lighting system 40 does not use a serrated main reflection face, the shape is simplified and the fabrication cost is reduced. Moreover, the cost can further be reduced because it is unnecessary to form a mirror face on the total internal reflection face c4 through metallization.

Figure 21:
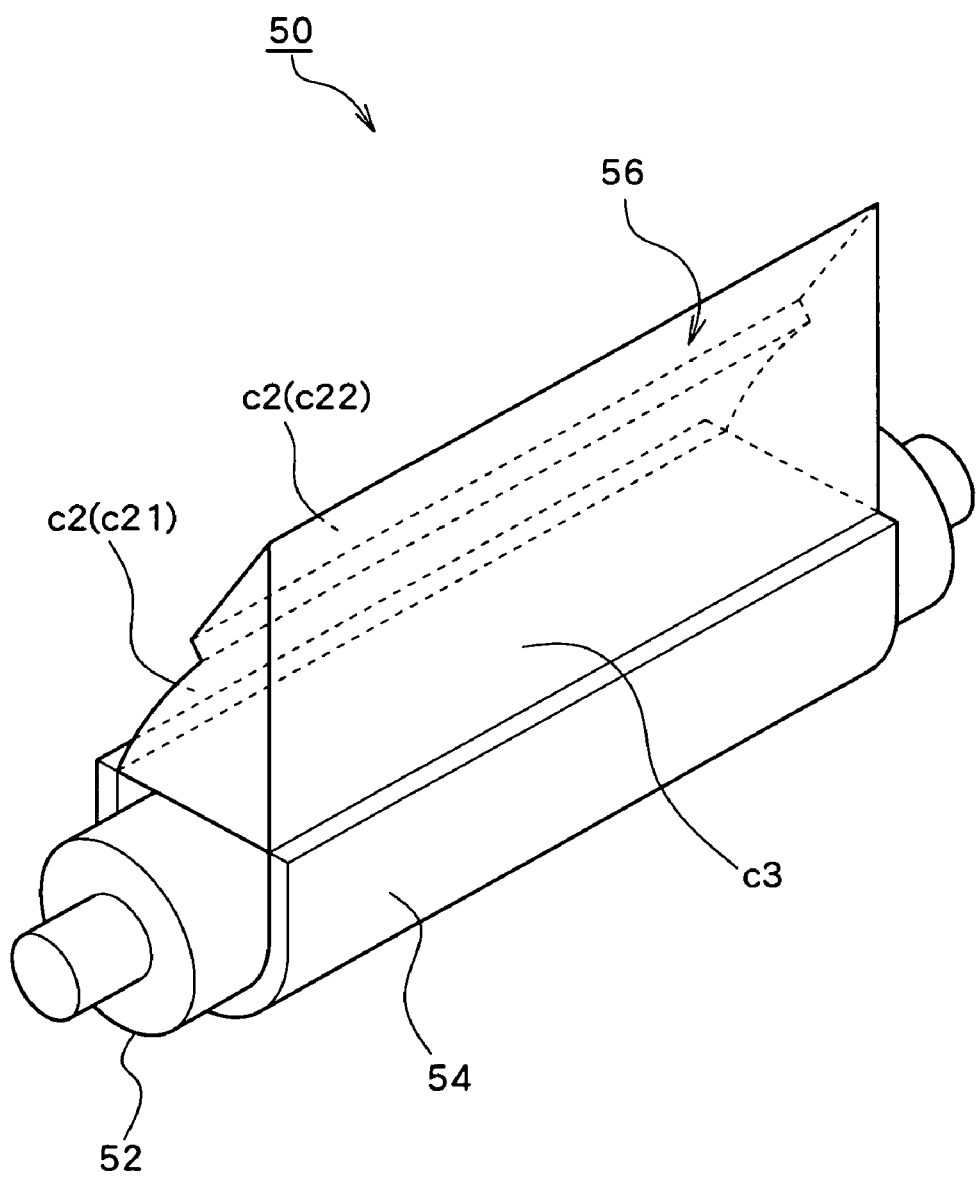
FIG. 21 is a perspective view showing the appearance of a lighting system 50 of still another embodiment.

FIG. 21 is an enlarged view showing a lighting system 50 of still another embodiment of the present invention. The lighting system 50 can be a component of a digital camera, similar to the lighting systems 20, 30, and 40. An arc tube 52 is the same as the above-described arc tube 22. A reflector 54 has three portions, a circular arc portion b1 and first and second linear portions b2 and b3, similarly to the reflectors 24, 34, and 44. However, the system 50 is different from the systems 20, 30, and 40 in that the first linear portion b2 is not tilted, but it is set in parallel with the second linear portion b3. FIG. 4 shows dimensions of various portions of the lighting system 50. An optical member 56 also has a light reception face c1, main reflection face c2, and light emission face c3, and the main reflection face includes two reflection faces c21 and c22 and has the shape, similarly to the optical members 26 and 36 described above, although the specific dimensions differ. FIG. 4 shows dimensions of various portions of the lighting system 50.

Figure 22:
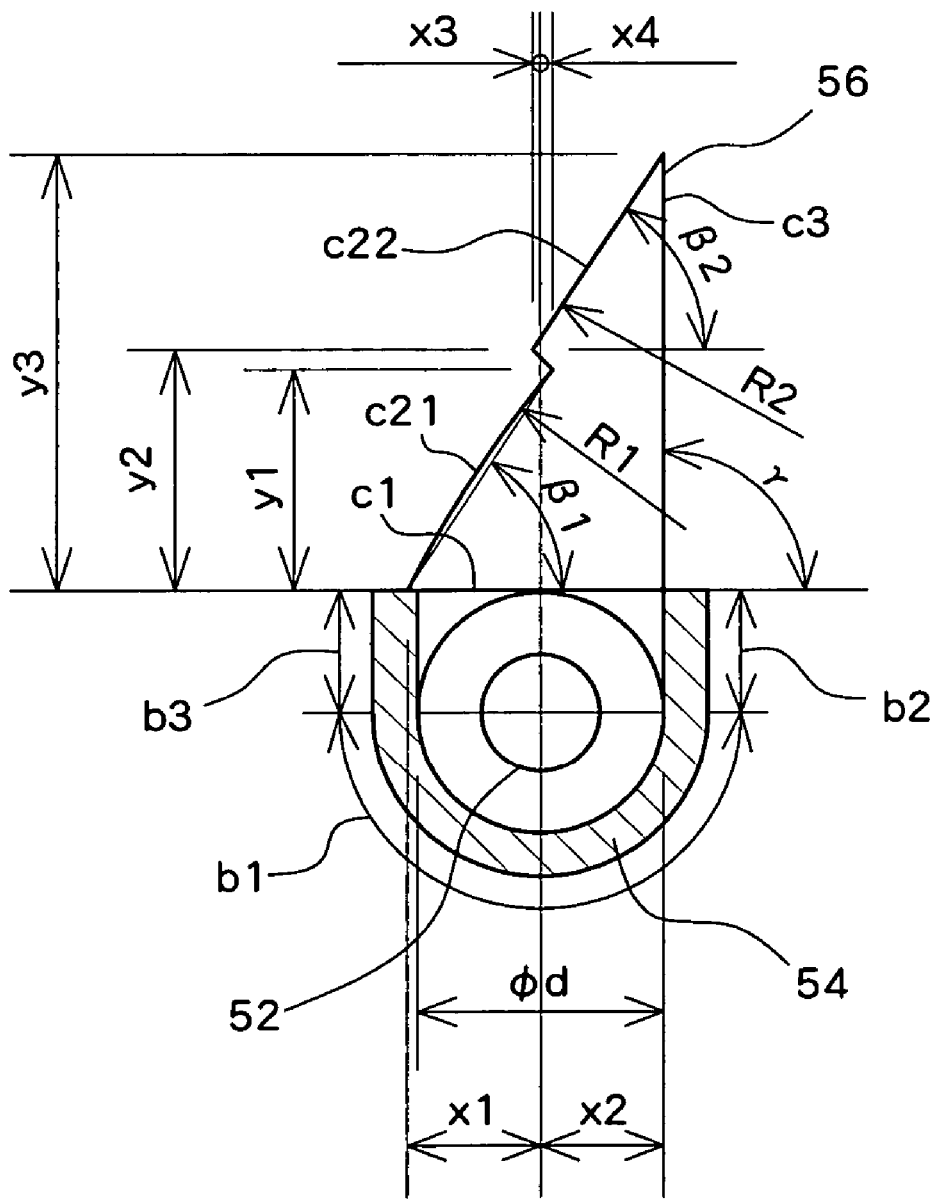
FIG. 22 is a sectional view showing dimensions of various portions of the lighting system 50.

FIG. 22 is an illustration showing the shape of the lighting system 50 at a cross section orthogonal to the axis of the arc tube similar to FIG. 3 or the like. Members of the lighting system have a constant cross section in the axis direction of the arc tube 52. The refraction index of the optical member 56 is similarly 1.49.

The reflector 54 comprises the three illustrated portions b1, b2, and b3. A portion for covering a semicircular portion of the far side of the arc tube 52 from the optical member 56 is the circular arc portion b1, a portion located between an end of the light emission face c3 of the circular arc portion b1 and the light emission face c3 is the first linear portion b2, and a portion located between the other end of the circular arc portion b1 and the reflection face c2 is the second linear portion b3. The function of the circular arc portion b1 is the same as that of the above-described reflector 24 and its description will not be repeated. In the lighting system 50, the first and second linear portions b2 and b3 are arranged almost orthogonally to the light reception face c1.

The main reflection face c2 of the optical member 56 is serrated, on which two reflection faces are formed. The reflection face at the side close to the light reception face c1 is called a first reflection face c21 and the other reflection face is called a second reflection face c22. The first reflection face c21 is a concave face slightly drawing an arc and its radius is 10 mm (R1). The radius of the reflection face c22 is infinite, that is, the face c22 is a plane. Moreover, these reflection faces have an angle of 53.23° (β1) and 57.5° (β2) from the light reception face c1. These inclinations are shown by an angle formed between a straight line for passing through both endpoints of a reflection face drawing a circular arc and the light reception face c1.

Figure 23:
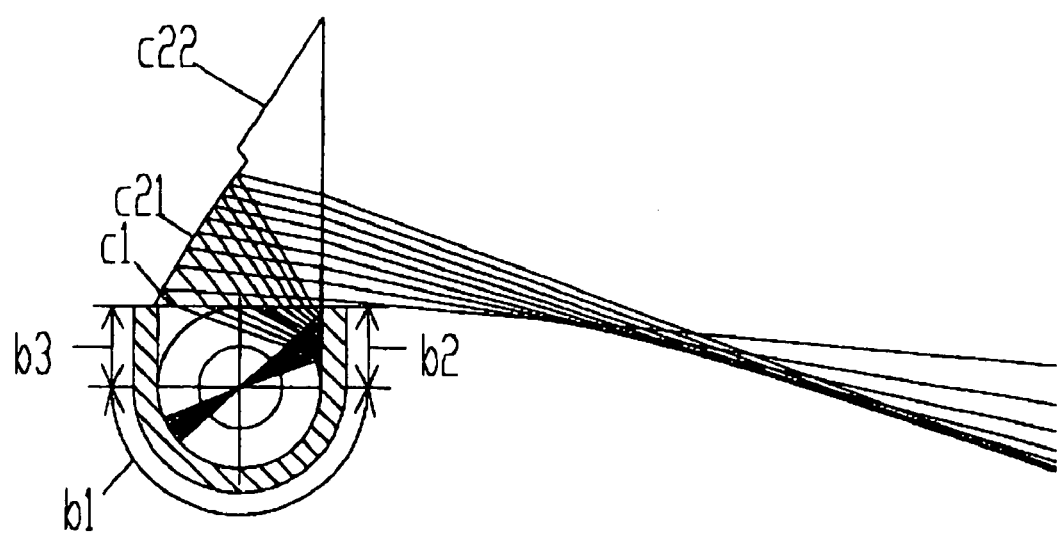
FIG. 23 is an illustration showing paths of light fluxes of the lighting system 50.

FIGS. 23 to 26 are illustrations showing paths of light fluxes emitted from the arc tube 52. FIG. 23 is an illustration showing paths of light fluxes directly reaching the first linear portion b2 of the reflector 54 from the arc tube 52 and entering the optical member 56. The light fluxes enter the optical member 56 from the light reception face c1 of the optical member, reach the main reflection face, particularly the first reflection face c21, are reflected from the face c21, head for the light emission face c3, and are emitted from the light emission face. Light fluxes not entering the optical member 56 through reflected from the first linear portion b2 head for the second linear portion b3 and reflected from the portion b3 and enter the optical member 56 while repeating reflection on the portion b2 and the portion b3.

Figure 24:
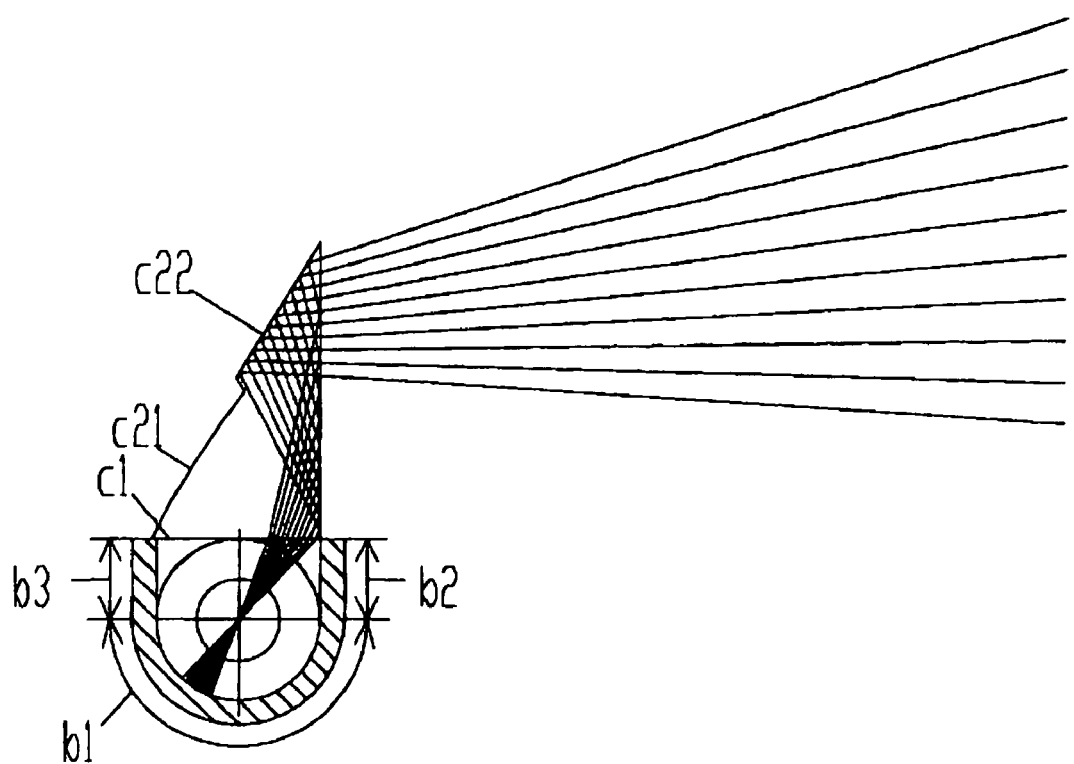
FIG. 24 is an illustration showing paths of light fluxes of the lighting system 50.

FIG. 24 is an illustration showing paths of light fluxes directly reaching the light emission face c3 of the optical member 56 from the arc tube 52. Light fluxes passing through the light reception face c1 of the optical member 56 and directly reaching the light emission face c3 are totally reflected from the face c3 and reach the main reflection face, particularly the second reflection face c22. Then, the light fluxes are reflected from the second reflection face c22, returned to the light emission face c3 and emitted from the face c3. By reflecting the light fluxes from the light emission face c3 and again reflecting them towards the main reflection face c2 from where they are emitted, it is possible to direct the light fluxes to the front face, that is, towards an object.

Figure 25:
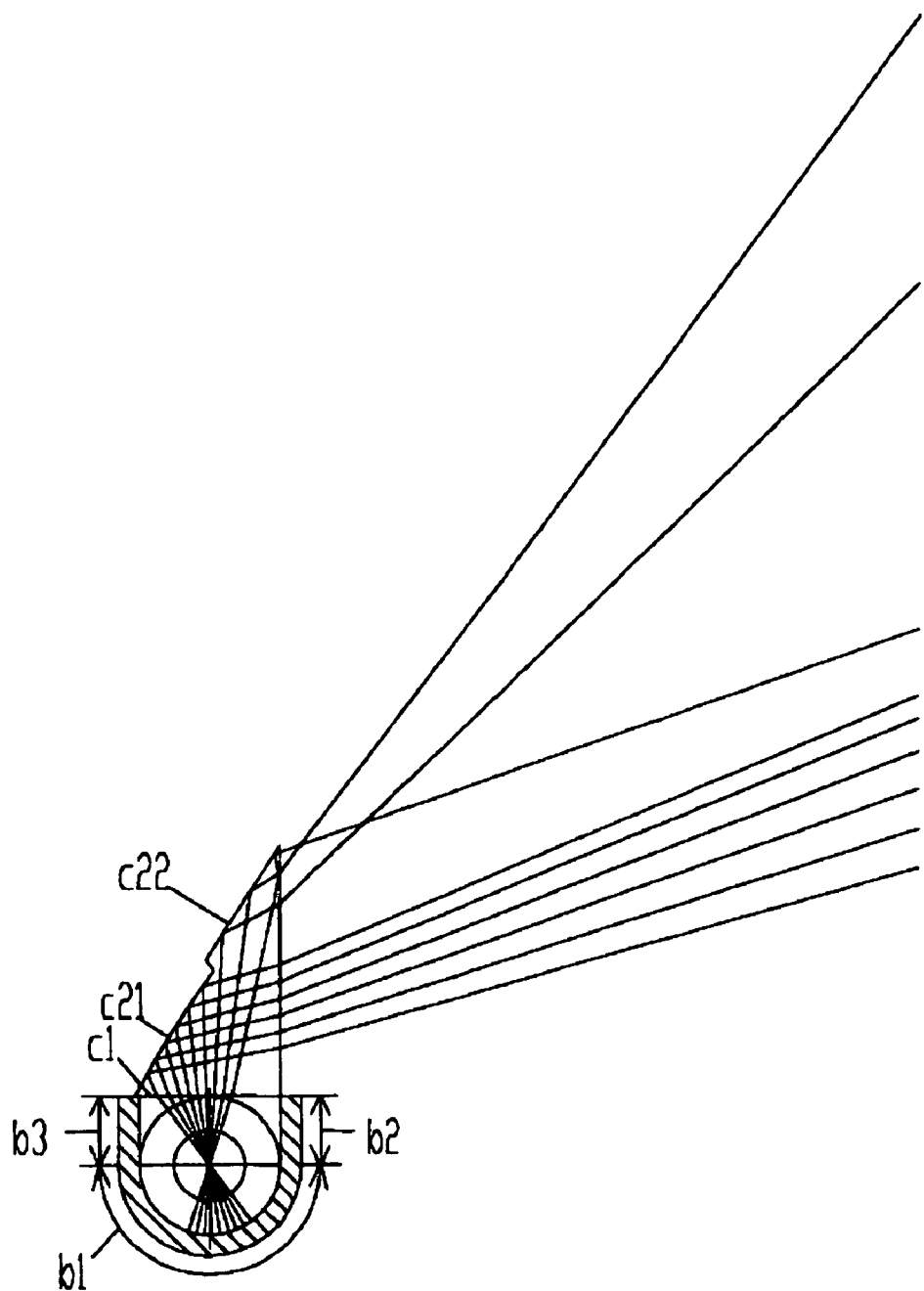
FIG. 25 is an illustration showing paths of light fluxes of the lighting system 50.

FIG. 25 is an illustration showing paths of light fluxes directly reaching the main reflection face c2 of the optical member 56 from the arc tube 52. The light fluxes are reflected from the main reflection face c2 and then all light fluxes head for the light emission face c3 and are emitted. After the light fluxes are reflected from the reflection face c2 and returned to the light reception face c1, it is possible to efficiently guide the light fluxes to the light emission face without being emitted from the face c1.

Figure 26:
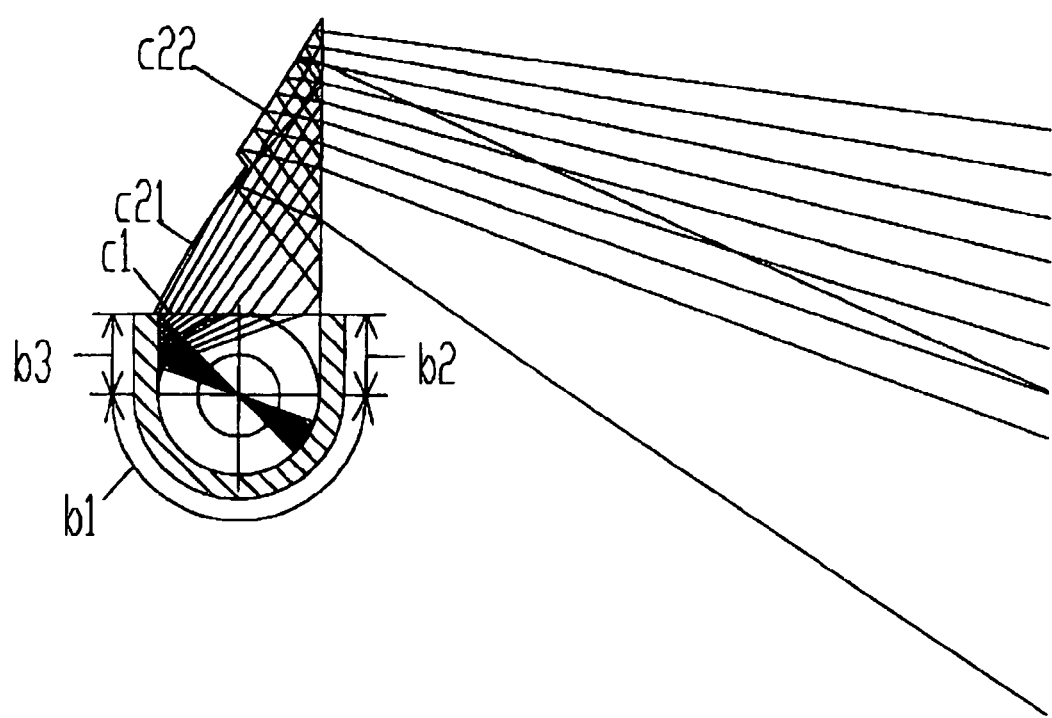
FIG. 26 is an illustration showing paths of light fluxes of the lighting system 50.

FIG. 26 is an illustration showing paths of light fluxes directly reaching the second linear portion b3 of the reflector from the arc tube 52, moreover reflecting, and entering the optical member from the light reception face c1. Light fluxes incoming from the light reception face c1 of the optical member, among light fluxes reflected from the second linear portion b3, are reflected directly or by being reflected from the first reflection face c21 and reach the light emission face c3. The light fluxes reaching the light emission face c3 are reflected from the face c3, head for the main reflection face c2, are reflected and returned to the light emission face c3, and emitted. Moreover, light fluxes reaching the first linear portion b2 among light fluxes reflected from the second linear portion b3 of the reflector, are reflected from the portion b2 and enter the optical member 56, while reflection is repeated many times.

By dividing a main reflection face into two faces so as to have different angles and curvatures, flux distribution to the object side is controlled. It is preferable that the angles β1 and β2 formed between the first and second reflection faces c21 and c22 and the light reception face c1 be set within the range of greater than or equal to 40° and less than or equal to 70°. Outside of this range of values, some light fluxes reflected from the main reflection face c21 are totally reflected from the light emission face c3, while some of the light fluxes are refracted, such that they are transmitted as stray light fluxes and thereby represent lost light.

While the-lighting systems 20, 30, 40, and 50 according to the above-described four embodiments show examples in which the reflector 24 includes a semicircular arc portion b1, the portion b1 may have any shape as long as light from the arc tube 22 can be reflected toward the light receiving face c1 side. in place of the arc portion b1, it is possible to alternatively employ a concave portion having a shape such as an ellipsoid, paraboloid, or polygonal surface.

PARTS LIST

B1 Illustrated Three Portions
B1 Circular Arc Portion
B2 Illustrated Three Portions
B2 First Linear Portion
B3 Illustrated Three Portions
B3 Second Linear Portion
C1 Light Reception Face
C1 Two Reflection Faces
C2 Main Reflection Face
C2 Two Reflection Faces
C3 Light Emission Face
C4 Internal Reflection Face
C4 Total Reflection Face
C21 First Reflection Face
C22 Second Reflection Face
10 Digital Camera
12 Body
14 Photography System
16 Shutter
20 Lighting System
22 Arc Tube
24 Reflector
24 Optical Member
24 Umbrella
26 Optical Member
30 Lighting System
32 Arc Tube
34 Reflector
36 Optical Member
40 Lighting System
42 Arc Tube
44 Reflector
44 Umbrella
46 Optical Member
50 Lighting System
52 Arc Tube
54 Reflector
56 Optical Member

What is claimed is:

1. A lighting system comprising:
    a light source:
    a reflector for reflecting some of light fluxes emitted from the light source;
    an optical member, wherein the optical member includes:
    a light reception face for receiving light fluxes from the light source and the reflector;
    a main light reflection face for reflecting light fluxes toward an object side;
    a light emission face which directs light fluxes directly incoming from the light reception face towards a main reflection face though total internal reflection, and transmits light directly incoming from the main light reflection face such that the light is emitted towards the object side;
    wherein the reflector has a concave portion opposed to the light reception face with respect to the light source, a first linear portion extending from one end of the concave portion to an object side end of the light reception face, and a second linear portion extending from the other end of the concave portion to an end of the light reception face opposite from the object side end, and the first linear portion reflects light fluxes from the light source or the second linear portion towards the main light reflection face or the light emission face; and
    wherein the main reflection face has a face in which an angle formed with the light reception face is greater than or equal to 40° and less than or equal to 70°.

2. The lighting system according to claim 1, wherein the main reflection face has two light reflection faces and each of the two light reflection faces forms an angle with the light reception face, the angle is greater than or equal to 40° and less than or equal to 70°.

3. A lighting system comprising:
a light source;
a reflector for reflecting some of light fluxes emitted from the light source;
an optical member, wherein the optical member includes:
a light reception face for receiving light fluxes from the light source and the reflector;
a main light reflection face for reflecting light fluxes toward an object side;
a light emission face which directs light fluxes directly incoming from the light reception face towards a main reflection face through total internal reflection, and transmits light directly incoming from the main light reflection face such that the light is emitted towards the object side;
wherein the reflector has a concave portion opposed to the light reception face with respect to the light source, a first linear portion extending from one end of the concave portion to an object side end of the light reception face, and a second linear portion extending from the other end of the concave portion to an end of the light reception face opposite from the object side end, and the first linear portion reflects light fluxes from the light source or the second liner portion towards the main light reflection face or the light emission face;
wherein the concave portion of the reflector has a semicircular arc shape, and
in a cross-sectional plane which is orthogonal to both the light reception face and the light emission face, the angle formed between the light reception face and the first liner portion is greater than or equal to 30° and less than or equal to 75°.

4. A lighting system comprising:
a light source;
a reflector for reflecting some of light fluxes emitted from the light source;
an optical member, wherein the optical member includes:
a light reception face for receiving light fluxes from the light source and the reflector;
a main light reflection face for reflecting light fluxes toward an object side;
a light emission face which directs light fluxes directly incoming from the light reception face towards a main reflection face through total internal reflection, and transmits light directly incoming from the main light reflection face such that the light is emitted towards the object side;
wherein the reflector has a concave portion opposed to the light reception face with respect to the light source, a first liner portion extending from one end of the concave portion to an object side end of the light reception face, and a second linear portion extending from the other end of the concave portion to an end of the light reception face opposite from the object side end, and the first linear portion reflects light fluxes from the light source or the second liner portion towards the main light reflection face or the light emission face; and
wherein a light flux directly reaching the first linear portion from the light source is reflected to directly reach the main reflection face.

5. The lighting system according to claim 4, wherein
a light flux reflected from the second linear portion and reaching the first linear portion is reflected and directly reaches the main reflection face.

6. The lighting system according to claim 5, wherein
the main reflection face has a first reflection portion close to a light reception face and a second reflection portion far from the light reception face,
the first reflection portion is set to a position avoiding a light flux reflected from a second linear reflection portion of the reflector and directly heading for the light emission face, and
the second reflection portion is set to a position reached by all of the light fluxes which directly travel from a light source to the light emission face and are totally reflected from the light emission face.

7. The lighting system according to claim 6, wherein
an angle formed between the light reception face and the first linear portion of the reflector is 65°, the angle formed between the light reception face and the second linear portion of the reflector is 90°, the angle formed between the light reception face and the first reflection portion of the main reflection face is 54.89°, and the angle formed between the light reception face and the second reflection portion of the main reflection face is 53.67°.

8. A lighting system comprising:
a light source;
a reflector for reflecting some of light fluxes emitted from the light source;
an optical member, wherein the optical member includes:
a light reception face for receiving the fluxes from the light source and the reflector;
a main light reflection face for reflecting light fluxes toward an object side;
a light emission face which directs light fluxes directly incoming from the light reception face towards a main reflection face through total internal reflection, and transmits light directly incoming from the main light reflection face such that the light is emitted towards the object side;
wherein the reflector has a concave portion opposed to the light reception face with respect to the light source, a first linear portion extending from one end of the concave portion to an object side end of the light reception face, and a second linear portion extending from the other end of the concave portion to an end of the light reception face opposite from the object side end, and the first linear portion reflects light fluxes from the light source or the second linear portion towards the main light reflection face or the light emission face; and
wherein a light flux reflected from the second linear portion and reaching the first linear portion is reflected and directly reaches the main reflection face.

9. A lighting system comprising:
a light source;
a reflector for reflecting some of light fluxes emitted from the light source;
an optical member, wherein the optical member includes:
a light reception face for receiving light fluxes from the light source and the reflector;
a main light reflection face for reflecting light fluxes toward an object side;
a light emission face which directs light fluxes directly incoming from the light reception face towards a main reflection face through total internal reflection, and transmits light directly incoming from the main light reflection face such that the light is emitted towards the object side;
wherein the reflector has a concave portion opposed to the light reception face with respect to the light source, a first linear portion extending from one end of the concave portion to an object side end of the light reception face, and a second linear portion extending from the other end of the concave portion to an end of the light reception face opposite from the object side end, and the first linear portion reflects light fluxes from the light source or the second linear portion towards the main light reflection face or the light emission face; and wherein a light flux emitted from the light source or reflected from the second linear portion and reaching the first linear portion is reflected directly towards the light emission face.

10. The lighting system according to claim 9, wherein the main reflection face has a first reflection portion close to the light reception face and a second reflection portion far from the light reception face, and an angle formed between the light reception face and the first linear portion of a reflector is 30°, an angle formed between the light reception face and the second linear portion of the reflector is 90° and an angle formed between the light reception face and the first reflection portion of a main reflection face is 53.96°, and the angle formed between the light reception face and the second reflection portion of the main reflection face is 58.5°.

11. A lighting system comprising:

a light source;

a reflector for reflecting some of light fluxes emitted from the light source;

an optical member, wherein the optical member includes:

a light reception face for receiving light fluxes from the light source and the reflector;

a main light reflection face for reflecting light fluxes toward an object side;

a light emission face which directs light fluxes directly incoming from the light reception face towards a main reflection face through total internal reflection, and transmits light directly incoming from the main light reflection face such that the light is emitted towards the object side;

wherein the reflector has a concave portion opposed to the light reception face with respect to the light source, a first linear portion extending from one end of the concave portion to an object side end of the light reception face, and a second linear portion extending from the other end of the concave portion to an end of the light reception face opposite from the object side end, and the first linear portion reflects light fluxes from the light source or the second linear portion towards the main light reflection face or the light emission face;

wherein the main reflection face has a first reflection portion close to the light reception face and a second reflection portion far from the light reception face, and the second reflection portion is set to a position reached by all of the light fluxes which directly travel from the light source to the light emission face and are totally reflected from the light emission face.

12. The lighting system according to claim 11, wherein an angle formed between a light reception face and the first liner portion of the reflector is 69°, an angle formed between the light reception face and the second linear portion of the reflector is 90°, the angle formed between the light reception face and the first reflection portion of the main reflection face is 87.85°, and the angle formed between the light reception face and the second reflection portion of the main reflection face is 56.69°.

13. A lighting system comprising:

a light source;

a reflector for reflecting some of light fluxes emitted from the light source;

an optical member, wherein the optical member includes:

a light reception face for receiving light fluxes from the light source and the reflector;

a main light reflection face for reflecting light fluxes toward an object side;

a light emission face which directs light fluxes directly incoming from the light reception face towards a main reflection face through total internal reflection, and transmits light directly incoming from the main light reflection face such that the light is emitted towards the object side;

wherein the reflector has a concave portion opposed to the light reception face with respect to the light source, a first linear portion extending from one end of the concave portion to an object side end of the light reception face, and a second linear portion extending from the other end of the concave portion to an end of the light reception face opposite from the object side end, and the first linear portion reflects light fluxes from the light source or the second linear portion towards the main light reflection face or the light emission face; and wherein:

the light reception face is orthogonal to the light emission face, the reflector has a semicircular arc portion formed at the opposite side to the light reception face about the light source, the first liner portion formed between an end of the semicircular arc portion and the light emission face, and the second linear portion formed between the other end of the semicircular arc and the main reflection face; and the main reflection face has a first reflection portion close to the light reception face and a second reflection portion far from the light reception face, a light reflux directing reaching the first linear portion from the light source and reflected here directly reaches the first reflection portion of the main reflection face, and a light flux directly reaching the light emission face from the light source and reflected here directly through total internal reflection reaches the second reflection portion of the main reflection face.

14. A lighting system comprising:

a light source;

a reflector for reflecting some of light fluxes emitted from the light source; and an optical member, wherein the optical member includes:

a light reception face for receiving light fluxes from the light source and the reflector;

a main light reflection face for reflecting light fluxes toward an object side; and a light emission face which directs light fluxes directly incoming from the light reception face towards a main reflection face through total internal reflection, and transmits light directly incoming from the main light reflection face such that the light is emitted towards the object side;

wherein the reflector has a concave portion opposed to the light reception face with respect to the light source, a first linear portion extending from one end of the concave portion to an object side end of the light reception face, and a second linear portion extending from the other end of the concave portion to an end of the light reception face opposite from the object side end, and the first linear portion reflects light fluxes from the light source or the second linear portion towards the main light reflection face or the light emission face; and wherein the light source is a cylindrical flash discharge tube.

* * * * *

UNITED STATES PATENT AND TRADEMARK OFFICE
CERTIFICATE OF CORRECTION

PATENT NO. : 7,465,081 B2  Page 1 of 1
APPLICATION NO. : 11/371654
DATED : December 16, 2008
INVENTOR(S) : Taro Kushida It is certified that error appears in the above-identified patent and that said Letters Patent is hereby corrected as shown below:

| | |
|---|---|
| Claim 1, line 2 | "source:" should read --source;--. |
| Claim 1, line 12 | "though" should read --through--. |
| Claim 3, line 24 | "liner" should read --linear--. |
| Claim 3, line 31 | "liner" should read --linear--. |
| Claim 4, line 18 | "liner" should read --linear--. |
| Claim 4, line 24 | "liner" should read --linear--. |
| Claim 8, line 6 | "the fluxes" should read --light fluxes--. |
| Claim 12, line 3 | "liner" should read --linear--. |
| Claim 13, line 31 | "liner" should read --linear--. |

Signed and Sealed this

Tenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,465,081 B2  Page 1 of 1
APPLICATION NO. : 11/371654
DATED : December 16, 2008
INVENTOR(S) : Taro Kushida It is certified that error appears in the above-identified patent and that said Letters Patent is hereby corrected as shown below:

| | |
|---|---|
| Column 12, Claim 1, line 38 | "source:" should read --source;--. |
| Column 12, Claim 1, line 48 | "though" should read --through--. |
| Column 13, Claim 3, line 26 | "liner" should read --linear--. |
| Column 13, Claim 3, line 33 | "liner" should read --linear--. |
| Column 13, Claim 4, line 52 | "liner" should read --linear--. |
| Column 13, Claim 4, line 59 | "liner" should read --linear--. |
| Column 14, Claim 8, line 28 | "the fluxes" should read --light fluxes--. |
| Column 15, Claim 12, line 57 | "liner" should read --linear--. |
| Column 16, Claim 13, line 25 | "liner" should read --linear--. |

This certificate supersedes the Certificate of Correction issued March 10, 2009.

Signed and Sealed this

Thirty-first Day of March, 2009

JOHN DOLL
*Acting Director of the United States Patent and Trademark Office*